(12) United States Patent
Claridge et al.

(10) Patent No.: US 8,500,848 B2
(45) Date of Patent: Aug. 6, 2013

(54) SYSTEMS AND METHODS FOR AIR DEHUMIDIFICATION AND COOLING WITH MEMBRANE WATER VAPOR REJECTION

(75) Inventors: David E. Claridge, College Station, TX (US); Charles H. Culp, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 13/294,807

(22) Filed: Nov. 11, 2011

(65) Prior Publication Data

US 2012/0118147 A1 May 17, 2012

Related U.S. Application Data

(60) Provisional application No. 61/413,327, filed on Nov. 12, 2010.

(51) Int. Cl.
*B01D 53/22* (2006.01)

(52) U.S. Cl.
USPC .............. 95/52; 95/43; 95/45; 96/4; 96/7; 96/9; 96/10

(58) Field of Classification Search
USPC ................ 95/43, 45, 52; 96/4, 7, 9, 10
See application file for complete search history.

(56) References Cited

U.S. PATENT DOCUMENTS

| 2,517,499 A | * | 8/1950 | McGrath | 62/93 |
| 3,604,246 A | * | 9/1971 | Toren | 73/38 |
| 3,735,559 A | * | 5/1973 | Salemme | 95/52 |
| 4,900,448 A | | 2/1990 | Bonne et al. | |
| 4,931,070 A | * | 6/1990 | Prasad | 95/52 |
| 5,034,025 A | * | 7/1991 | Overmann, III | 95/52 |
| 5,071,451 A | | 12/1991 | Wijmans | |

(Continued)

FOREIGN PATENT DOCUMENTS

| JP | 60238120 A | 11/1985 |
| JP | 63054920 A | 3/1988 |

(Continued)

OTHER PUBLICATIONS

Kinsara, A., et al.; "Proposed energy-efficient air-conditioning system using liquid desiccant", Applied Therman Engineering, 16 (10), 791-806, 1996.

(Continued)

*Primary Examiner* — Jason M Greene
*Assistant Examiner* — Anthony Shumate
(74) *Attorney, Agent, or Firm* — Fletcher Yoder, P.C.

(57) ABSTRACT

The present disclosed embodiments relate to systems and methods for dehumidifying air by establishing a humidity gradient across a water selective permeable membrane in a dehumidification unit. Water vapor from relatively humid atmospheric air entering the dehumidification unit is extracted by the dehumidification unit without substantial membrane water vapor rejection into a low pressure water vapor chamber operating at a partial pressure of water vapor lower than the partial pressure of water vapor in the relatively humid atmospheric air. For example, water vapor is extracted through a water permeable membrane of the dehumidification unit into the low pressure water vapor chamber. As such, the air exiting the dehumidification unit is less humid than the air entering the dehumidification unit. The low pressure water vapor extracted from the air is subsequently expelled through a membrane vapor rejection unit to ambient conditions.

21 Claims, 18 Drawing Sheets

U.S. PATENT DOCUMENTS

| | | | |
|---|---|---|---|
| 5,118,327 A * | 6/1992 | Nelson et al. | 95/10 |
| 5,205,842 A | 4/1993 | Prasad | |
| 5,236,474 A * | 8/1993 | Schofield et al. | 95/47 |
| 5,256,295 A * | 10/1993 | Baker et al. | 210/640 |
| 5,259,869 A | 11/1993 | Auvil et al. | |
| 5,383,956 A | 1/1995 | Prasad et al. | |
| 5,525,143 A | 6/1996 | Morgan et al. | |
| 5,641,337 A * | 6/1997 | Arrowsmith et al. | 95/39 |
| 6,346,142 B1 * | 2/2002 | Jetter et al. | 96/9 |
| 6,619,064 B1 | 9/2003 | Piao et al. | |
| 6,786,059 B1 | 9/2004 | Piao et al. | |
| 7,604,681 B2 | 10/2009 | Malsam et al. | |
| 7,767,256 B2 | 8/2010 | Gu et al. | |
| 8,221,530 B2 * | 7/2012 | Peter et al. | 96/9 |
| 2008/0138569 A1 | 6/2008 | Collier et al. | |
| 2008/0237919 A1 | 10/2008 | Liu et al. | |
| 2008/0299377 A1 | 12/2008 | Gu et al. | |
| 2009/0000475 A1 | 1/2009 | Fekety et al. | |
| 2009/0110873 A1 | 4/2009 | Jiang et al. | |
| 2009/0110907 A1 | 4/2009 | Jiang et al. | |
| 2010/0072291 A1 | 3/2010 | Matsubara | |
| 2010/0297531 A1 | 11/2010 | Liu et al. | |
| 2010/0304953 A1 | 12/2010 | Liu et al. | |
| 2011/0045971 A1 | 2/2011 | Collier et al. | |
| 2011/0052466 A1 | 3/2011 | Liu | |
| 2011/0100900 A1 | 5/2011 | Drury et al. | |
| 2011/0274835 A1 | 11/2011 | Liu et al. | |

FOREIGN PATENT DOCUMENTS

| | | |
|---|---|---|
| JP | 05228328 A | 9/1993 |
| JP | 2002136830 A | 5/2002 |
| JP | 2004286262 A | 10/2004 |
| WO | 2008106028 | 9/2008 |

OTHER PUBLICATIONS

Harriman, L.G., et al.; ASHRAE Journal, Nov. 1997, 37-45.

Li, Z., et al.; "Long-term chemical and biological stability of surfacant-modified zeolite", Environ. Sci. Technol., 32 (17), 2628-2632, 1998.

El-Dessouky, H.T., et al.; "A novel air conditioning system—Membrane air drying and evaporative cooling", Chemical Engineering Research & Design, 78 (A7): 999-1009, 2000.

Kawahara, K., et al.; "Antibacterial effect of silver-zeolite on oral bacteria under anaerobic conditions", Dental Materials, 16 (16), 452-455, 2000.

Koros, W.J., et al.; "Pushing the limits on possibilities for large-scale gas separation: which strategies?", J. Mem. Sci. 175, 181-196, 2000.

Scovazzo, P., et al.; "Membrane porosity and hydrophilic membrane-based dehumidification performance", J. Mem. Sci., 167, 217-225, 2000.

Morigami, Y., et al.; "The first large-scale pervaporation plant using tubular-type module with zeolite NaA membrame", Sep. and Purification Tech. 25, 251-260, 2001.

Liu, W., et al.; "Monolithic reactor for the dehydrogenation of ethylbenzene to styrene", Ind. Eng. Chem. Res., 41, 3131-38, 2002.

Ye, H.H., et al.; "Water transport properties of Nafion membranes—Part I. Single-tube membrane module for air drying", Journal of Membrane Science, 221 (1-2): 147-161, 2003.

Bhattacharya, M., et al.; "Mass-Transfer Coefficients in Washcoated Monoliths", AIChE J. 50, 2939-2955, 2004.

Kangoglu, M., et al.; "Energy and exergy analyses of an experimental open-cycle desiccant cooling system", Applied Thermal Engineering, 24, 919-923, 2004.

Feng, N., et al.; "Applications of natural zeolite to construction and building materials in China", Construction and Building Materials, 19(80), 579-584, 2005.

Mina, E.M., et al.; "A generalized coefficient of performance for conditioning moist air", International Journal of Refrigeration, 28, 784-790, 2005.

O'Neill, C., et al.; "Durability of hydrophilic and antimicrobial zeolite coatings under water immersion", AIChE Journal, vol. 52, No. 3, 1157-1161, 2006.

Yin, Y.G., et al.; "Experimental study on dehumidifier and regenerator of liquid desiccant cooling air conditioning system", Building and Environment 42 (7), 2505-2511, 2007.

Li, J.L., et al.; "Dehumidification and humidification of air by surface-soaked liquid membrane module with triethylene glycol", Journal of Membrane Science, 325 (2):1007-1012, 2008.

Liu, W.; "High surface area inorganic membrane for process water removal", Quarterly Progress Report to DOE Industrial Technology Program Office, Award No. DE-FC36-04GO98014, from Oct. 1, 2008 to present.

Zhang, L.Z., et al.; "Synthesis and characterization of a PVA/LiCl blend membrane for air dehumidification", Journal of Membrane Science, 308 (1-2), 198-206, 2008.

Bernardo, P., et al.; "Membrane gas separation: a review/state of the art", Ind. Eng. Chem. Res., 48, 4638-4663, 2009.

Liang, C.H., et al.; "Independent air dehumidification with membrane-based total heat recovery: Modeling and experimental validation", International Journal of Refrigeration-Revue Internationale Du Froid, 33 (2): 398-408, 2010.

Xiong, Z.Q., et al.; "Development of a novel two-stage liquid desiccant dehumidification system assisted by CaCl2 solution using exergy analysis method", Applied Energy, 87 (5):1495-1504, 2010.

Zhang, J., et al.; "Air dehydration membranes for non-aqueous lithium-air batteries", J. Electrochem. Soc., May 2010, in print.

Zhang, J., et al.; "Oxygen-selective immobilized liquid membranes for operation of lithium-air batteries in ambient air", Journal of Power Sources, May 2010, in print.

Scovazzo, P., et al.; "Hydrophilic membrane-based humidity control", J. Mem. Sci., 149, 69-81, 1998.

Ye, X., et al.; "Water transport properties of Nafion membranes—Part II. Multi-tube membrane module for air drying", Journal of Membrane Science, 221 (1-2): 163-173, 2003.

PCT International Search Report; PCT/US2011/060481; Jun. 26, 2012, pp. 1-9.

Tegrotenhuis, Ward, et al.; "Passive microchannel humidifier for PEM fuel cell water management," 234th ACS National Meeting, Aug. 19-23, 2007, Boston, MA (1 page).

Turner, D., P.E., Ph.D.; "Case Studies of High Humidity Problems in Hot and Humid Climates in the United States," Proceedings: Indoor Air 2005, Energy Systems Laboratory, Texas A&M University System, College Station, Texas, p. 1438-1444.

\* cited by examiner

SYSTEMS AND METHODS FOR AIR DEHUMIDIFICATION AND COOLING WITH MEMBRANE WATER VAPOR REJECTION

This application is a Non-Provisional patent application of U.S. Provisional Patent Application No. 61/413,327, entitled "Systems and Methods for Air Dehumidification and Cooling", filed Nov. 12, 2010, which is incorporated by reference in its entirety herein.

BACKGROUND

Heating, ventilating, and air conditioning (HVAC) systems often have dehumidification systems integrated into the cooling apparatus for dehumidifying the air being conditioned by such systems. When cooling is required in warm to hot environments, the air being cooled and dehumidified will usually have a humidity ratio above approximately 0.009 (pounds of $H_2O$ per pounds of dry air). In these environments, the HVAC systems traditionally use refrigerant compressors for sensible cooling of the air and removal of latent energy (i.e., humidity). The air is typically cooled to about 55° F., which condenses $H_2O$ out of the air until the air is about 100% saturated (i.e., relative humidity at about 100%). The 55° F. temperature lowers the humidity ratio to about 0.009 pounds of $H_2O$ per pound of dry air, which is the water vapor saturation point at 55° F., resulting in a relative humidity of almost 100%. When this air warms to about 75° F., the humidity ratio remains approximately the same, and the relative humidity drops to approximately 50%. This traditional method of dehumidification requires the air to be cooled to about 55° F., and can usually achieve a coefficient of performance (COP) of approximately 3-5.

BRIEF DESCRIPTION

Certain embodiments commensurate in scope with the present disclosure are summarized in the following. These embodiments are not intended to limit the scope of the claimed invention, but rather these embodiments are intended only to provide a brief summary of possible forms of the invention. Indeed, the invention may encompass a variety of forms that may be similar to or different from the embodiments set forth in the following.

In a first embodiment, a dehumidification system for removing water vapor from an airstream is provided. The dehumidification system includes a first and second channel separated by a first membrane, wherein the first membrane is configured to facilitate removal of water vapor from an airstream flowing through the first channel by facilitating passage of $H_2O$ from the water vapor to the second channel through permeable volumes of the first membrane while substantially blocking all other components of the airstream from passing through the first membrane. The dehumidification system further includes a first pressure increasing device configured to create a lower partial pressure of water vapor within the second channel than in the first channel, such that the $H_2O$ moves through the first membrane to the second channel, wherein the pressure increasing device is also configured to increase the pressure of water vapor at an outlet of the pressure increasing device to a partial pressure of water vapor in a range suitable for directing the water vapor into a membrane water vapor rejection system. The dehumidification system additionally includes the membrane water vapor rejection system configured to receive the water vapor from the first pressure increasing device and to permit the water vapor to be rejected to an atmosphere while substantially blocking flow of other air components from the atmosphere from entering into the membrane water vapor rejection system.

In a second embodiment, a system includes a dehumidification system for removing $H_2O$ vapor from an airstream. The dehumidification system includes an air channel configured to receive an inlet airstream and discharge an outlet airstream. The dehumidification system further includes a first $H_2O$ permeable material adjacent to the air channel, wherein the first $H_2O$ permeable material is configured to selectively enable $H_2O$ from $H_2O$ vapor in the inlet airstream to pass through the first $H_2O$ permeable material to a suction side of the first $H_2O$ permeable material and substantially block other components in the inlet airstream from passing through the first $H_2O$ permeable material to the suction side of the first $H_2O$ permeable material. The dehumidification system additionally includes a first pressure increasing device configured to create a lower partial pressure of $H_2O$ vapor on the suction side of the first $H_2O$ permeable material than the partial pressure of the $H_2O$ vapor in the inlet airstream to drive passage of the $H_2O$ from the $H_2O$ vapor in the inlet airstream through the first $H_2O$ permeable material, and to increase the pressure at an outlet of the pressure increasing device to a partial pressure of $H_2O$ vapor suitable for passing into a membrane water vapor rejection system, and the membrane water vapor rejection system configured to receive the water vapor from the first pressure increasing device and to permit the water vapor to be rejected to an atmosphere while substantially blocking flow of other air components from the atmosphere into the membrane water vapor rejection system.

In a third embodiment, a method using a pressure differential across an $H_2O$ permeable material to provide a force to move $H_2O$ through the $H_2O$ permeable material into an $H_2O$ vapor channel, wherein the $H_2O$ vapor channel has a partial pressure of $H_2O$ vapor in a range of approximately between 0.1 to 0.25 psia. The method further includes receiving $H_2O$ vapor from the $H_2O$ permeable material into the $H_2O$ vapor channel. The method additionally includes receiving the $H_2O$ vapor from the $H_2O$ vapor channel into a pressure increasing device and expelling the $H_2O$ vapor from the pressure increasing device at a partial pressure of $H_2O$ vapor in a range of approximately between 0.1 to 1.0 psia, and receiving the $H_2O$ vapor from the pressure increasing device into a membrane $H_2O$ vapor rejection system and expelling the $H_2O$ vapor to an atmosphere.

BRIEF DESCRIPTION OF THE DRAWINGS

These and other features, aspects, and advantages of embodiments of the present disclosure will become better understood when the following detailed description is read with reference to the accompanying drawings in which like characters represent like parts throughout the drawings, wherein.

DETAILED DESCRIPTION OF SPECIFIC EMBODIMENTS

Figure 1:
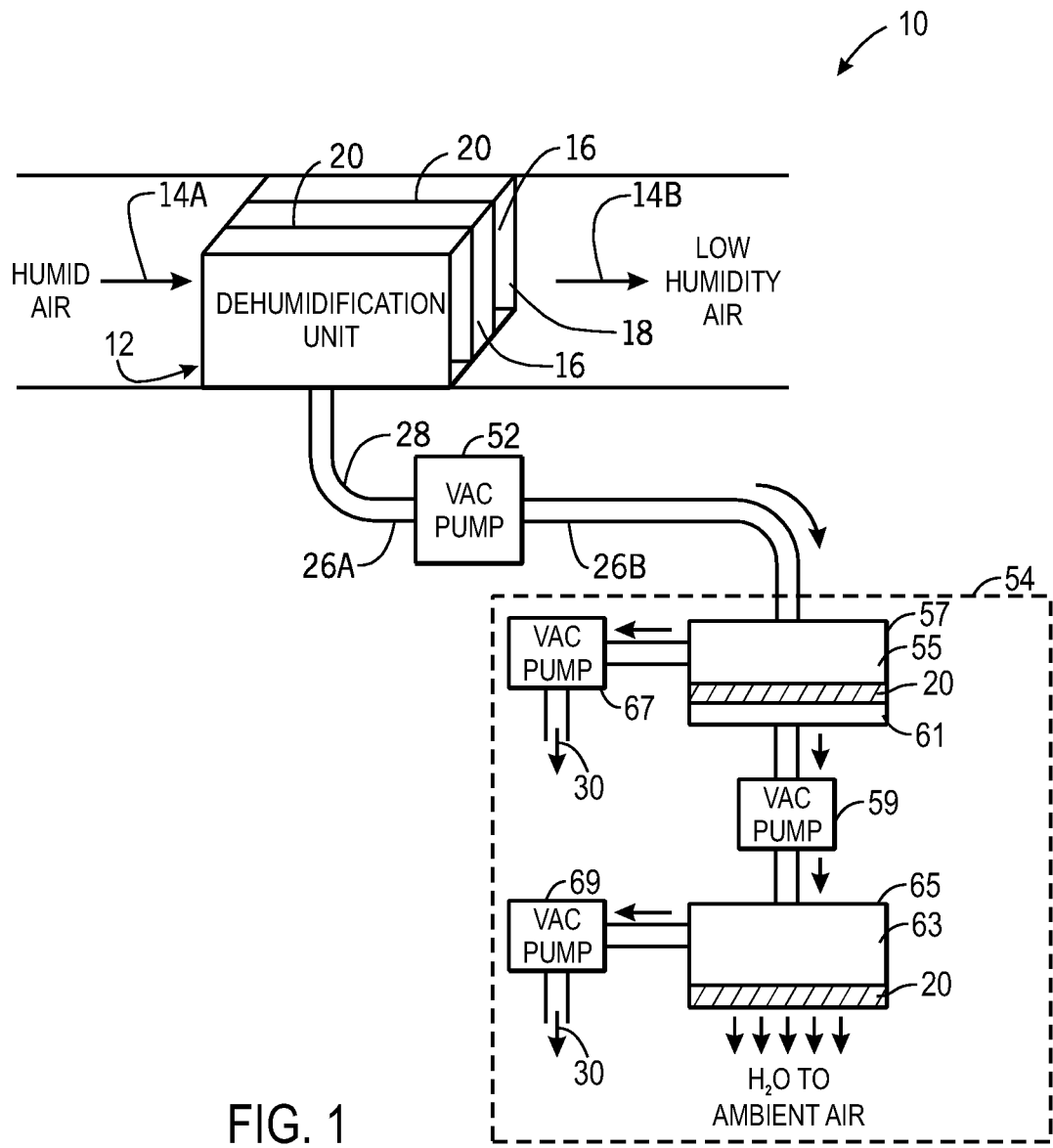
FIG. 1 is a schematic diagram of an HVAC system having a dehumidification unit in accordance with an embodiment of the present disclosure.

Specific embodiments of the present disclosure will be described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. It is to be noted that the values given herein may be approximate or exact, and may be read to also include ranges such as ±1%, 5%, 10%, 15%, 25%.

The subject matter disclosed herein relates to dehumidification systems and, more specifically, to systems and methods capable of dehumidifying air without initial condensation by establishing a humidity gradient in a dehumidification unit. In one embodiment, a water vapor permeable material (i.e., a water vapor permeable membrane) is used along at least one boundary separating an air channel from a secondary channel or chamber to facilitate the removal of water vapor from the air passing through the air channel. The secondary channel or chamber separated from the air channel by the water vapor permeable material may receive water vapor extracted from the air channel via the water vapor permeable material.

In operation, the water vapor permeable material allows the flow of $H_2O$ (which may refer to $H_2O$ as water molecules, gaseous water vapor, liquid water, adsorbed/desorbed water molecules, or combinations thereof) through the water vapor permeable material from the air channel to the secondary channel or chamber, while substantially blocking the flow of other components of the air flowing through the air channel from passing through the water vapor permeable material. As such, the water vapor permeable material reduces the humidity of the air flowing through the air channel by removing primarily only water vapor from the air. Correspondingly, the secondary channel or chamber is filled with primarily water vapor. It should be noted that the passage of $H_2O$ through the water vapor permeable material may be facilitated by a pressure differential. Indeed, a lower partial pressure of water vapor (i.e., a partial pressure less than the partial pressure of water vapor in the air channel) may be created in the secondary channel or chamber to further facilitate passage of the $H_2O$ through the water vapor permeable material. Accordingly, the side of the water vapor permeable material opposite the air channel may be referred to as the suction side of the water vapor permeable material.

Once the $H_2O$ has been passed through a first water vapor permeable membrane (e.g., membrane including zeolite), a vacuum pump is used to increase the partial pressure of the water vapor on the suction side of the water vapor permeable membrane to a partial pressure above that of the ambient air to enable rejection of the water vapor to ambient air, for example, by a second membrane unit operating to transfer water vapor to the ambient air while blocking the flow of other air components. That is, the vacuum pump compresses the water vapor to a pressure in a range suitable for rejecting the water vapor into the ambient air through another membrane. The pressure range may include a range of approximately 0.25-1.1 pounds per square inch absolute (psia), with the value depending on moisture content in the ambient air and desired operating conditions for membrane water vapor rejection. It should be noted that the dehumidification techniques described herein in general use significantly less energy than conventional systems.

While the embodiments described herein are primarily presented as enabling the removal of water vapor from air, other embodiments may enable the removal of other $H_2O$ components from air. For example, in certain embodiments, instead of a water vapor permeable material, an $H_2O$ permeable material may be used. As such, the $H_2O$ permeable material may allow the flow of one, all, or any combination of $H_2O$ components (i.e., water molecules, gaseous water vapor, liquid water, adsorbed/desorbed water molecules, absorbed/desorbed water molecules, and so forth) through the $H_2O$ permeable material from the air channel to the secondary channel or chamber, while substantially blocking the flow of other components of the air flowing through the air channel from passing through the $H_2O$ permeable material. In other words, the disclosed embodiments are not limited to the removal of water vapor from air, but rather to the removal of $H_2O$ (i.e., in any of its states) from air. However, for conciseness, the embodiments described herein are primarily focused on the removal of water vapor from air.

FIG. 1 is a schematic diagram of an HVAC system 10 having a dehumidification unit 12 in accordance with an embodiment of the present disclosure. As illustrated, the dehumidification unit 12 may receive inlet air 14A having a relatively high humidity and expel outlet air 14B having a relatively low humidity. In particular, the dehumidification unit 12 may include one or more air channels 16 through which the air 14 (i.e., the inlet air 14A and the outlet air 14B) flows. In addition, the dehumidification unit 12 may include one or more water vapor channels 18 adjacent to the one or more air channels 16. As illustrated in FIG. 1, the air 14 does not flow through the water vapor channels 18. Rather, the embodiments described herein enable the passage of water vapor from the air 14 in the air channels 16 to the water vapor channels 18, thus dehumidifying the air 14 and accumulating water vapor in the water vapor channels 18. In particular, water vapor from the air 14 in the air channels 16 may be allowed to flow through an interface 20 (i.e., a barrier or membrane) between adjacent air channels 16 and water vapor channels 18, while the other components (e.g., nitrogen, oxygen, carbon dioxide, and so forth) of the air 14 are blocked from flowing through the interface 20. In general, the water vapor channels 18 are sealed to create the low pressure that pulls the water vapor from the air 14 in the air channels 16 through the interfaces 20 as $H_2O$ (i.e., as water molecules, gaseous water vapor, liquid water, adsorbed/desorbed water molecules, absorbed/desorbed water molecules, and so forth, through the interfaces 20).

As such, a humidity gradient is established between the air channels 16 and adjacent water vapor channels 18. The humidity gradient is generated by a pressure gradient between the air channels 16 and adjacent water vapor channels 18. In particular, the partial pressure of water vapor in the water vapor channels 18 is maintained at a level lower than the partial pressure of water vapor in the air channels 16, such that the water vapor in the air 14 flowing through the air channels 16 tends toward the suction side (i.e., the water vapor channels 18 having a lower partial pressure of water vapor) of the interfaces 20.

Components of air other than $H_2O$ may be substantially blocked from passing through the interfaces 20 in accordance with present embodiments. In other words, in certain embodiments, approximately 95% or more, approximately 96% or more, approximately 97% or more, approximately 98% or more, or approximately 99% or more of components of the air 14 other than $H_2O$ (e.g., nitrogen, oxygen, carbon dioxide, and so forth) may be blocked from passing through the interfaces 20. When compared to an ideal interface 20 that blocks 100% of components other than $H_2O$, an interface 20 that blocks 99.5% of components other than $H_2O$ will experience a reduction in efficiency of approximately 2-4%. As such, the components other than $H_2O$ may be periodically or continuously purged to minimize these adverse effects on efficiency.

Figure 2A:
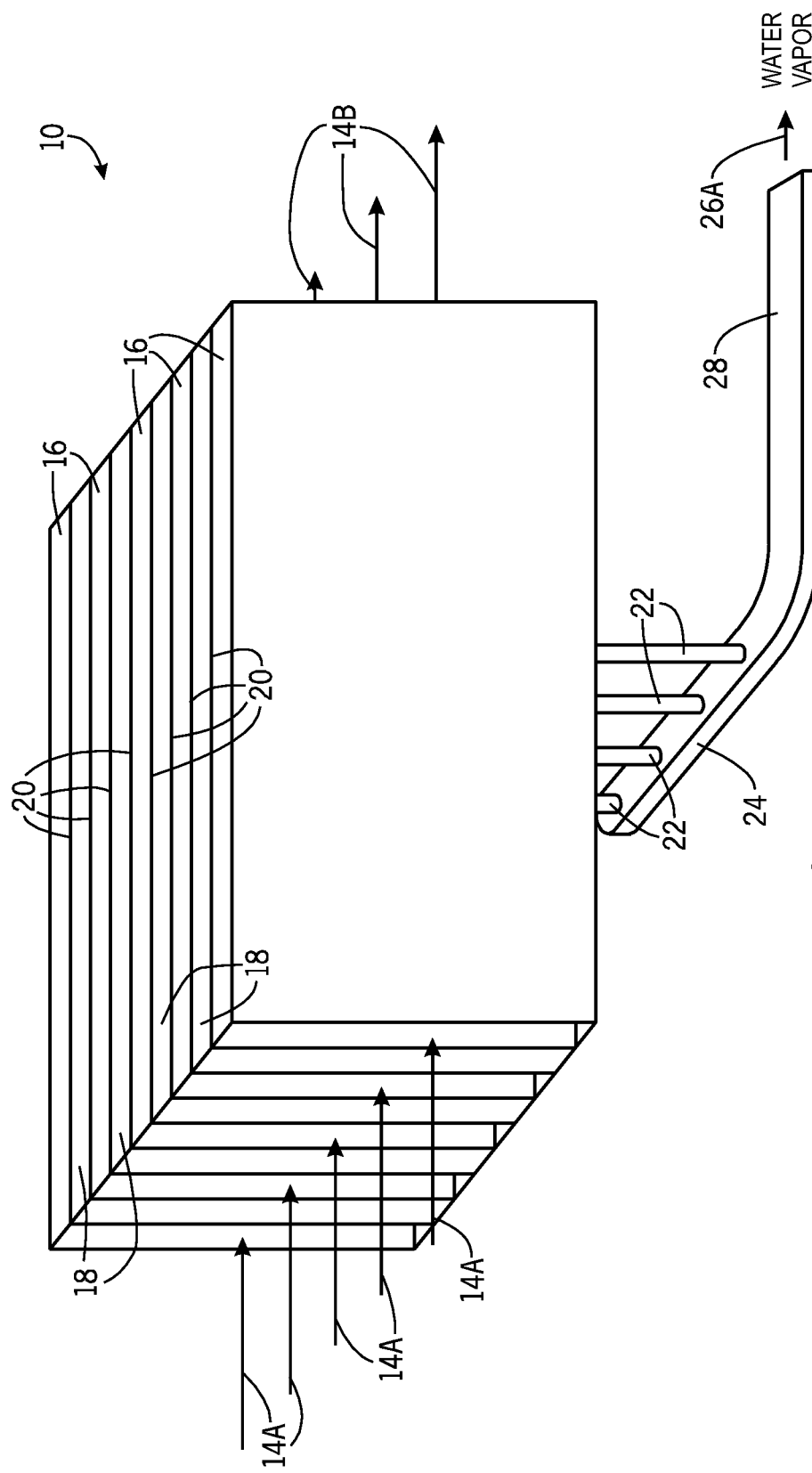
FIG. 2A is a perspective view of the dehumidification unit of FIG. 1 having multiple parallel air channels and water vapor channels in accordance with an embodiment of the present disclosure.

FIG. 2A is a perspective view of the dehumidification unit 12 of FIG. 1 having multiple parallel air channels 16 and water vapor channels 18 in accordance with an embodiment of the present disclosure. In the embodiment illustrated in FIG. 2A, the air channels 16 and the water vapor channels 18 are generally rectilinear channels, which provide a substantial amount of surface area of the interfaces 20 between adjacent air channels 16 and water vapor channels 18. Further, the generally rectilinear channels 16, 18 enable the water vapor 26A to be removed along the path of the air channels 16 before the air 14 exits the air channels 16. In other words, the relatively humid inlet air 14A (e.g., air with a dew point of 55° F. or higher such that the air is appropriate for air conditioning) passes straight through the air channels 16 and exits as relatively dry outlet air 14B because moisture has been removed as the air 14 traverses along the atmospheric pressure side of the interfaces 20 (i.e., the side of the interfaces 20 in the air channels 16). In an embodiment where a single unit is dehumidifying to a 60° F. saturation pressure or below, the suction side of the interfaces 20 (i.e., the side of the interfaces 20 in the water vapor channels 18) will generally be maintained at a partial pressure of water vapor that is lower than the partial pressure of water vapor on the atmospheric pressure side of the interfaces 20.

Figure 2B:
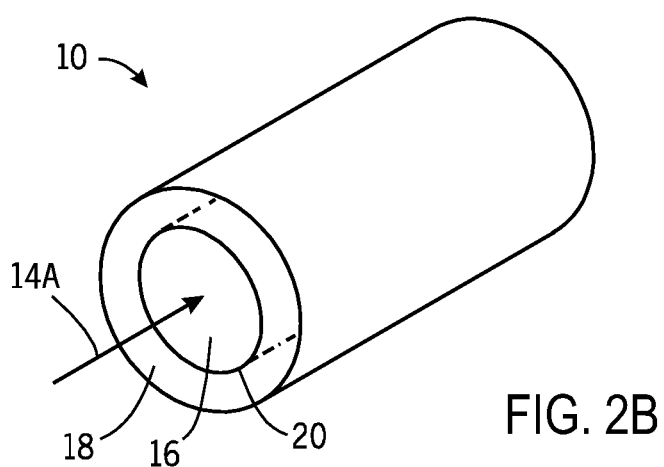
FIG. 2B is a perspective view of the dehumidification unit of FIG. 1 having a single air channel located inside a single water vapor channel in accordance with an embodiment of the present disclosure.

As illustrated in FIG. 2A, each of the water vapor channels 18 is connected with a water vapor channel outlet 22 through which the water vapor in the water vapor channels 18 is removed. As illustrated in FIG. 2A, in certain embodiments, the water vapor channel outlets 22 may be connected via a water vapor outlet manifold 24, wherein the water vapor 26A from all of the water vapor channels 18 is combined in a single water vapor vacuum volume 28, such as a tube or a chamber. Other configurations of the air channels 16 and the water vapor channels 18 may also be implemented. As another example, FIG. 2B is a perspective view of the dehumidification unit 12 of FIG. 1 having a single air channel 16 located inside a single water vapor channel 18 in accordance with an embodiment of the present disclosure. As illustrated, the air channel 16 may be a cylindrical air channel located within a larger concentric cylindrical water vapor channel 18. The embodiments illustrated in FIGS. 2A and 2B are merely exemplary and are not intended to be limiting.

Figure 3:
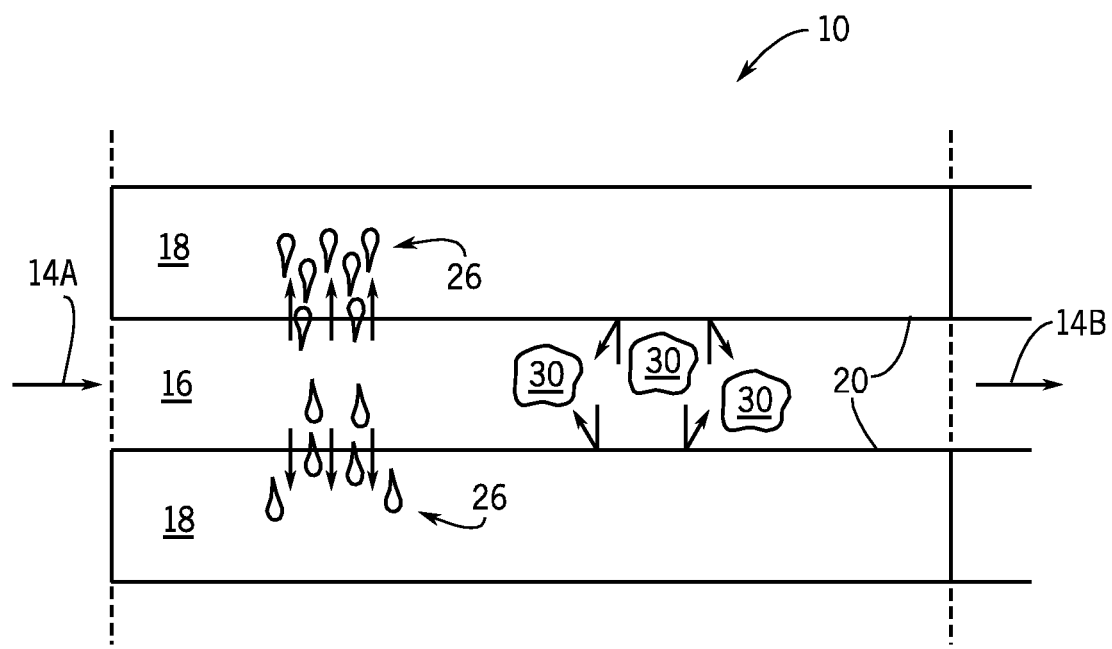
FIG. 3 is a plan view of an air channel and adjacent water vapor channels of the dehumidification unit of FIGS. 1, 2A, and 2B in accordance with an embodiment of the present disclosure.

FIG. 3 is a plan view of an air channel 16 and adjacent water vapor channels 18 of the dehumidification unit 12 of FIGS. 1, 2A, and 2B in accordance with an embodiment of the present disclosure. In FIG. 3, a depiction of the water vapor 26 is exaggerated for illustration purposes. In particular, the water vapor 26 from the air 14 is shown flowing through the interfaces 20 between the air channel 16 and the adjacent water vapor channels 18 as $H_2O$ (i.e., as water molecules, gaseous water vapor, liquid water, adsorbed/desorbed water molecules, absorbed/desorbed water molecules, and so forth, through the interfaces 20). Conversely, other components 30 (e.g., nitrogen, oxygen, carbon dioxide, and so forth) of the air 14 are illustrated as being blocked from flowing through the interfaces 20 between the air channel 16 and the adjacent water vapor channels 18.

In certain embodiments, the interfaces 20 may include membranes that are water vapor permeable and allow the flow of $H_2O$ through permeable volumes of the membranes while blocking the flow of the other components 30. Again, it should be noted that when the $H_2O$ passes through the interfaces 20, it may actually pass as one, all, or any combination of states of water (e.g., as water vapor, liquid water, adsorbed/desorbed water molecules, absorbed/desorbed water molecules, and so forth) through the interfaces 20. For example, in one embodiment, the interfaces 20 may adsorb/desorb water molecules. In another example, the interfaces 20 may adsorb/desorb water molecules and enable passage of water vapor. In other embodiments, the interfaces 20 may facilitate the passage of water in other combinations of states. The interfaces 20 extend along the flow path of the air 14. As such, the water vapor 26 is continuously removed from one side of the interface 20 as the relatively humid inlet air 14A flows through the air channel 16. Therefore, dehumidification of the air 14 flowing through the air channel 16 is accomplished by separating the water vapor 26 from the other components 30 of the air 14 incrementally as it progresses along the flow path of the air channel 16 and continuously contacts the interfaces 20 adjacent to the air channel 16 from the inlet air 14A location to the outlet air 14B location.

In certain embodiments, the water vapor channels 18 are evacuated before use of the dehumidification unit 12, such that a lower partial pressure of the water vapor 26 (i.e., a partial pressure less than the partial pressure of water vapor in the air channels 16) is created in the water vapor channels 18. For example, the partial pressure of the water vapor 26 in the water vapor channels 18 may be in the range of approximately 0.10-0.25 psia during normal operation, which corresponds to dehumidifying to a 60° F. saturation pressure or below. In this example, an initial pressure in the 0.01 psia range may be used to remove noncondensables, whereas the partial pressure of water vapor in the air channels 16 may be in the range of approximately 0.2-1.0 psia. However, at certain times, the pressure differential between the partial pressure of the water vapor in the water vapor channels 18 and the air channels 16 may be as low as (or lower than) 0.01 psia. The lower partial pressure of water vapor in the water vapor channels 18 further facilitates the flow of water vapor 26 from the air channels 16 to the water vapor channels 18, because the air 14 flowing through the air channels 16 is at local atmospheric pressure (i.e., approximately 14.7 psia at sea level). Since the partial pressure of water vapor in the air 14 in the air channels 16 is greater than the partial pressure of the water vapor 26 in the water vapor channels 18, a pressure gradient is created from the air channels 16 to the water vapor channels 18. As described previously, the interfaces 20 between adjacent air channels 16 and water vapor channels 18 provide a barrier, and allow substantially only water vapor 26 to flow from the air 14 in the air channels 16 into the water vapor channels 18. As such, the air 14 flowing through the air channels 16 will generally decrease in humidity from the inlet air 14A to the outlet air 14B.

The use of water vapor permeable membranes as the interfaces 20 between the air channels 16 and the water vapor channels 18 has many advantages. In particular, in some embodiments, no additional energy is required to generate the humidity gradient from the air channels 16 to the water vapor channels 18. In addition, in some embodiments, no regeneration is involved and no environmental emissions (e.g., solids, liquids, or gases) are generated. Indeed, in accordance with one embodiment, separation of the water vapor 26 from the other components 30 of the air 14 via water permeable membranes (i.e., the interfaces 20) can be accomplished at energy efficiencies much greater than compressor technology used to condense water directly from the airstream.

Because water vapor permeable membranes are highly permeable to water vapor, the costs of operating the dehumidification unit 12 may be minimized because the air 14 flowing through the air channels 16 does not have to be significantly pressurized to facilitate the passage of $H_2O$ through the interfaces 20. Water vapor permeable membranes are also highly selective to the permeation of the water vapor from the air 14. In other words, water vapor permeable membranes are very efficient at preventing components 30 of the air 14 other than water vapor from entering the water vapor channels 18. This is advantageous because the $H_2O$ passes through the interfaces 20 due to a pressure gradient (i.e., due to the lower partial pressures of water vapor in the water vapor channels 18) and any permeation or leakage of air 14 into the water vapor channels 18 will increase the power consumption of the vacuum pump used to evacuate the water vapor channels 18. In addition, water vapor permeable membranes are rugged enough to be resistant to air contamination, biological degradation, and mechanical erosion of the air channels 16 and the water vapor channels 18. Water vapor permeable membranes may also be resistant to bacteria attachment and growth in hot, humid air environments in accordance with one embodiment.

Figure 4:
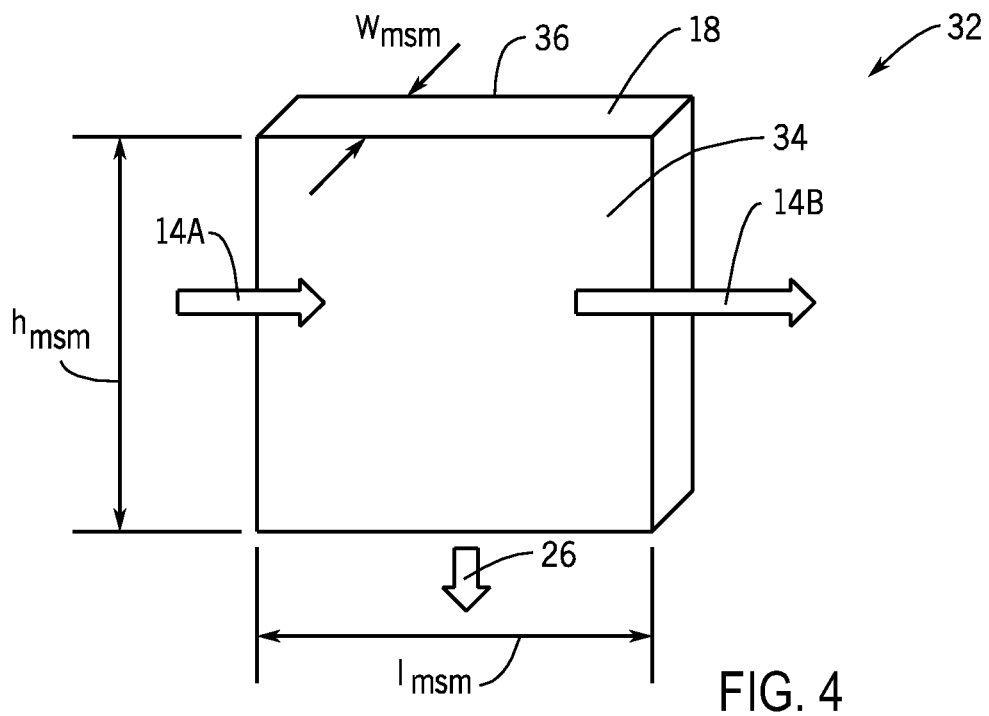
FIG. 4 is a perspective view of a separation module formed using a membrane that may be used as a water vapor channel of the dehumidification unit of FIGS. 1-3 in accordance with an embodiment of the present disclosure.

One example of a material used for the water vapor permeable membranes (i.e., the interfaces 20) is zeolite supported on thin, porous metal sheets. In particular, in certain embodiments, an ultrathin (e.g., less than approximately 2 μm), dense zeolite membrane film may be deposited on an approximately 50 μm thick porous metal sheet. The resulting membrane sheets may be packaged into a membrane separation module to be used in the dehumidification unit 12. FIG. 4 is a perspective view of a separation module 32 formed using a membrane that may be used as a water vapor channel 18 of the dehumidification unit 12 of FIGS. 1-3 in accordance with an embodiment of the present disclosure. Two membrane sheets 34, 36 may be folded and attached together into a generally rectangular shape with a channel for the water vapor having a width $w_{msm}$ of approximately 5 mm. The separation module 32 may be positioned within the dehumidification unit 12 such that the membrane coating surface is exposed to the air 14. The thinness of the metal support sheet reduces the weight and cost of the raw metal material and also minimizes resistance to the $H_2O$ diffusing through the water vapor permeable membrane film deposited on the membrane sheets 34, 36. The metallic nature of the sheets 34, 36 provides mechanical strength and flexibility for packaging such that the separation module 32 can withstand a pressure gradient of greater than approximately 60 psi (i.e., approximately 4 times atmospheric pressure).

Separation of water vapor from the other components 30 of the air 14 may create a water vapor permeation flux of approximately 1.0 $kg/m^2/h$ (e.g., in a range of approximately 0.5-2.0 $kg/m^2/h$), and a water vapor-to-air selectivity factor range of approximately 5-200+. As such, the efficiency of the dehumidification unit 12 is relatively high compared to other conventional dehumidification techniques with a relatively low cost of production. As an example, approximately 7-10 $m^2$ of membrane area of the interfaces 20 may be needed to dehumidify 1 ton of air cooling load under ambient conditions. In order to handle such an air cooling load, in certain embodiments, 17-20 separation modules 32 having a height $h_{msm}$ of approximately 450 mm, a length $l_{msm}$ of approximately 450 mm, and a width $w_{msm}$ of approximately 5 mm may be used. These separation modules 32 may be assembled side-by-side in the dehumidification unit 12, leaving approximately 2 mm gaps between the separation modules 32. These gaps define the air channels 16 through which the air 14 flows. The measurements described in this example are merely exemplary and not intended to be limiting.

Figure 5:
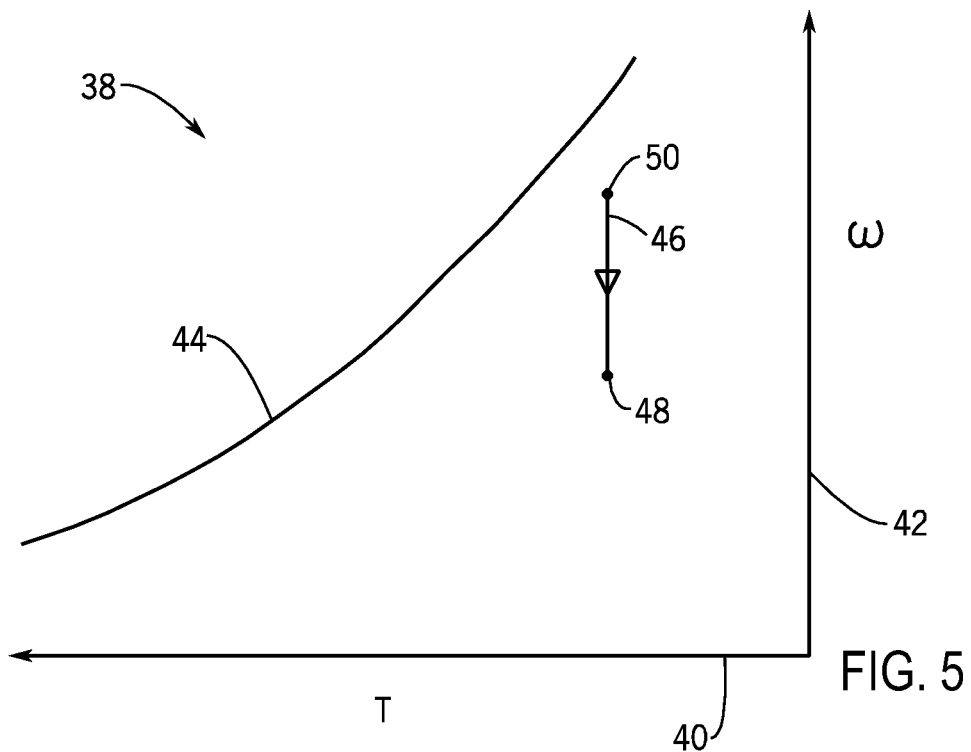
FIG. 5 is a psychrometric chart of the temperature and humidity ratio of the moist air flowing through the dehumidification unit of FIGS. 1-3 in accordance with an embodiment of the present disclosure.

FIG. 5 is a psychrometric chart 38 of the temperature and the humidity ratio of the moist air 14 flowing through the dehumidification unit 12 of FIGS. 1-3 in accordance with an embodiment of the present disclosure. In particular, the x-axis 40 of the psychrometric chart 38 corresponds to the temperature of the air 14 flowing through the air channels 16 of FIG. 1, the y-axis 42 of the psychrometric chart 38 corresponds to the humidity ratio of the air 14 flowing through the air channels 16, and the curve 44 represents the water vapor saturation curve of the air 14 flowing through the air channels 16. As illustrated by line 46, because water vapor is removed from the air 14 flowing through the air channels 16, the humidity ratio of the outlet air 14B (i.e., point 48) from the dehumidification unit 12 of FIGS. 1-3 is lower than the humidity ratio of the inlet air 14A (i.e., point 50) into the dehumidification unit 12 of FIGS. 1-3, while the temperature of the outlet air 14B and the inlet air 14A are substantially the same.

Returning now to FIG. 1, as described previously, a lower partial pressure of the water vapor 26 (i.e., a partial pressure less than the partial pressure of water vapor in the air channels 16) is created in the water vapor channels 18 of the dehumidification unit 12 to further facilitate the passage of $H_2O$ through the interfaces 20 from the air channels 16 to the water vapor channels 18. In certain embodiments, the water vapor channels 18 may initially be evacuated using a vacuum pump 52. In particular, the vacuum pump 52 may evacuate the water vapor channels 18 and the water vapor vacuum volume 28, as well as the water vapor outlets 22 and the water vapor manifold 24 of FIG. 2A. However, in other embodiments, a pump separate from the vacuum pump 52 may be used to evacuate the water vapor channels 18, water vapor vacuum volume 28, water vapor outlets 22, and water vapor manifold 24. As illustrated in FIG. 1, the water vapor 26 removed from the air 14 in the dehumidification unit 12 may be distinguished between the water vapor 26A in the water vapor vacuum volume 28 (i.e., the suction side of the vacuum pump 52) and the water vapor 26B expelled from an exhaust side (i.e., an outlet) of the vacuum pump 52 (i.e., the water vapor 26B delivered to a membrane water vapor rejection system 54). In general, the water vapor 26B expelled from the vacuum pump 52 will have a slightly higher pressure and a higher temperature than the water vapor 26A in the water vapor vacuum volume 28. The vacuum pump 52 may be a compressor or any other suitable pressure increasing device capable of maintaining a lower pressure on the suction side of the vacuum pump 52 than the partial pressure of water vapor in the humid air 14.

For example, the lower partial pressure of water vapor 26A maintained in the water vapor vacuum volume 28 may be in the range of approximately 0.15-0.25 psia, which corresponds to saturation temperatures of approximately 45° F. to 60° F., with the water vapor 26A typically be in the range of approximately 65-75° F. However, in other embodiments, the water vapor 26A in the water vapor vacuum volume 28 may be maintained at a partial pressure of water vapor in the range of approximately 0.01-0.25 psia and a temperature in the range of approximately 55° F. up to the highest ambient air temperature. A specific embodiment may be designed to lower the partial pressure in the water vapor vacuum volume 28 to the range of 0.01 psia to increase the capacity for removing water vapor from the air 14 to enable an evaporative cooler to process the entire air conditioning load when atmospheric conditions permit this mode of operation.

In certain embodiments, the vacuum pump 52 is a low-pressure pump configured to decrease the pressure of the water vapor 26A in the water vapor vacuum volume 28 to a lower partial pressure than the partial pressure of water vapor on the atmospheric side of the interfaces 20 (i.e., the partial pressure of the air 14 in the air channels 16). On the exhaust side of the vacuum pump 52, the partial pressure of the water vapor 26B has been increased just high enough to facilitate membrane water vapor rejection, that is, rejection of the water vapor. Indeed, the vacuum pump 52 is configured to increase the pressure such that the water vapor 26B in the membrane water vapor rejection system 54 is at a pressure just sufficient to enable rejection of the water vapor by the membrane water vapor rejection system 54.

As an example, in operation of the HVAC system 10, the air 14 may enter the system at a partial pressure of water vapor of 0.32 psia, which corresponds to a humidity ratio of 0.014 pounds of $H_2O$ per pounds of dry air. The system may be set to remove 0.005 pounds of $H_2O$ per pounds of dry air from the air 14. Pressure differentials across the interfaces 20 may be used to create a flow of $H_2O$ through the interfaces 20. For example, the partial pressure of water vapor in the water vapor vacuum volume 28 may be set to approximately 0.1 psia. The pressure of the water vapor 26B is increased by the vacuum pump 52 in a primarily adiabatic process, and as the pressure of the water vapor 26B increases, the temperature may increase as well (in contrast to the relatively negligible temperature differential across the interfaces 20). As such, if for example the pressure of the water vapor 26B is increased in the vacuum pump 52 by 0.3 psi (i.e., to approximately 0.4 psia), the membrane water vapor rejection system 54 is then capable of rejecting the water vapor 26B. The system may continually monitor the pressure and temperature conditions of both the upstream water vapor 26A and the downstream water vapor 26B to ensure that the water vapor 26B expelled from the vacuum pump 52 has a partial pressure of water vapor just high enough to facilitate membrane water vapor rejection in the membrane water vapor rejection system 54. It should be noted that the pressure and temperature values presented in this scenario are merely exemplary and are not intended to be limiting.

As the pressure difference from the water vapor 26A entering the vacuum pump 52 to the water vapor 26B exiting the vacuum pump 52 increases, the efficiency of the dehumidification unit 12 decreases. For example, in a one embodiment, the vacuum pump 52 will be set to adjust the pressure of the water vapor 26B to direct the water vapor 26B into the membrane water vapor rejection system 54. This pressure may be slightly above the water vapor pressure in the ambient air. Because the vacuum pump 52 only increases the pressure of the water vapor 26B to a point where rejection of the water vapor 26B is facilitated (i.e., slightly above the partial pressure of water vapor in the ambient air), the power requirements of the vacuum pump 52 are relatively small, thereby obtaining a high efficiency from the dehumidification unit 12.

Once the water vapor 26B has been slightly pressurized (i.e., compressed) by the vacuum pump 52, the water vapor 26B is directed into the membrane water vapor rejection system 54, wherein the water vapor 26B is rejected to ambient air, thus exiting the water vapor rejection system 54. In the depicted embodiment, the vacuum pump 52 transfers the water vapor 26B to a chamber 55 disposed above the membrane 20 of a first membrane container 57. In a simpler example (not shown), only the second membrane container and purge pump 69 are used, and the first membrane container 57 and purge pump 67 are not included. In this example, the water vapor is directed from the pump 52 into the second membrane container 65 and subsequently vented to the atmosphere. In the depicted embodiment, a vacuum pump 59 transfers $H_2O$ and air from a chamber 61 of the membrane container 57 into a chamber 63 of a second membrane container 65, above the membrane 20. The $H_2O$ is transferred across the membrane 20 disposed in the membrane container 65 to atmospheric pressure because of a partial pressure difference between the air and the vacuum side (which may be in the pressure range of 2 kPa). It is to be noted that while each membrane container 57 and 65 is depicted as including a single membrane 20, in other embodiments, multiple membranes 20 may be include and disposed, for example, in layers with certain spacing (or no spacing) between each layer. Further, other embodiments of the membrane containers 57 and 65 may include more 2, 3, 4, 5, 6, 7, 8 or more chambers.

In certain embodiments, purge pumps 67 and 69 may be included in the system 54. The purge pumps 67 and 69 may include vacuum pumps used to remove other air components (e.g., noncondensable components) from the membrane containers 57 and 65. All vacuum pumps 52 and 59, as well as purge pumps 67 and 69 can operate either continuously, periodically or with variable speed control and may be controlled by a control system, as described in more detail below with respect to FIG. 7.

Although the interfaces 20 between the air channels 16 and the water vapor channels 18 as described previously generally allow only $H_2O$ to pass from the air channels 16 to the water vapor channels 18, in certain embodiments, very minimal amounts (e.g., less than a few percent of the oxygen ($O_2$), nitrogen ($N_2$), or other air components) of the other components (e.g., noncondensable components) 30 of the air 14 may be allowed to pass through the interfaces 20 from the air channels 16 to the water vapor channels 18. Over time, the amount of the other components 30 may build up in the water vapor channels 18 (as well as in the water vapor vacuum volume 28, the water vapor outlets 22, and the water vapor manifold 24 of FIG. 2A). In general, these other components 30 are not be rejected through the membrane water vapor rejection system 54. As such, the components 30 may adversely affect the performance of the vacuum pump 52 and all other equipment downstream of the vacuum pump 52 membrane water vapor rejection.

During operation of the membrane vapor rejection system 54, the pump 59 may operate in a low to medium vacuum pressure (e.g., between 0.5 KPa to 15 KPa). Accordingly, the water vapor 26B may pass from the membrane container 57 into the membrane container 65. However, other air components 30 (e.g., oxygen, nitrogen, carbon dioxide) may be substantially prevented from passing into the chamber 63. However, because the membrane 20 is not perfectly efficient (e.g., perfectly prevents other air components from passing through) a few of these other air components 30 may pass onto the chamber 63. The chamber 55 may then be purged (either continuously or cyclically) by the purge pump 67. The water vapor in the second membrane container 65 may then be rejected into the atmosphere. The pump 69 may then be used to purge other air components 30 that may have made their way into the chamber 63. Optimizing such a system would include using minimal energy to drive the pump 52 and the pump 59 to get the water vapor into the atmosphere. A control system may be programmed or otherwise manufactured for this optimization, such as a control system depicted in FIG. 7.

Figure 6A:
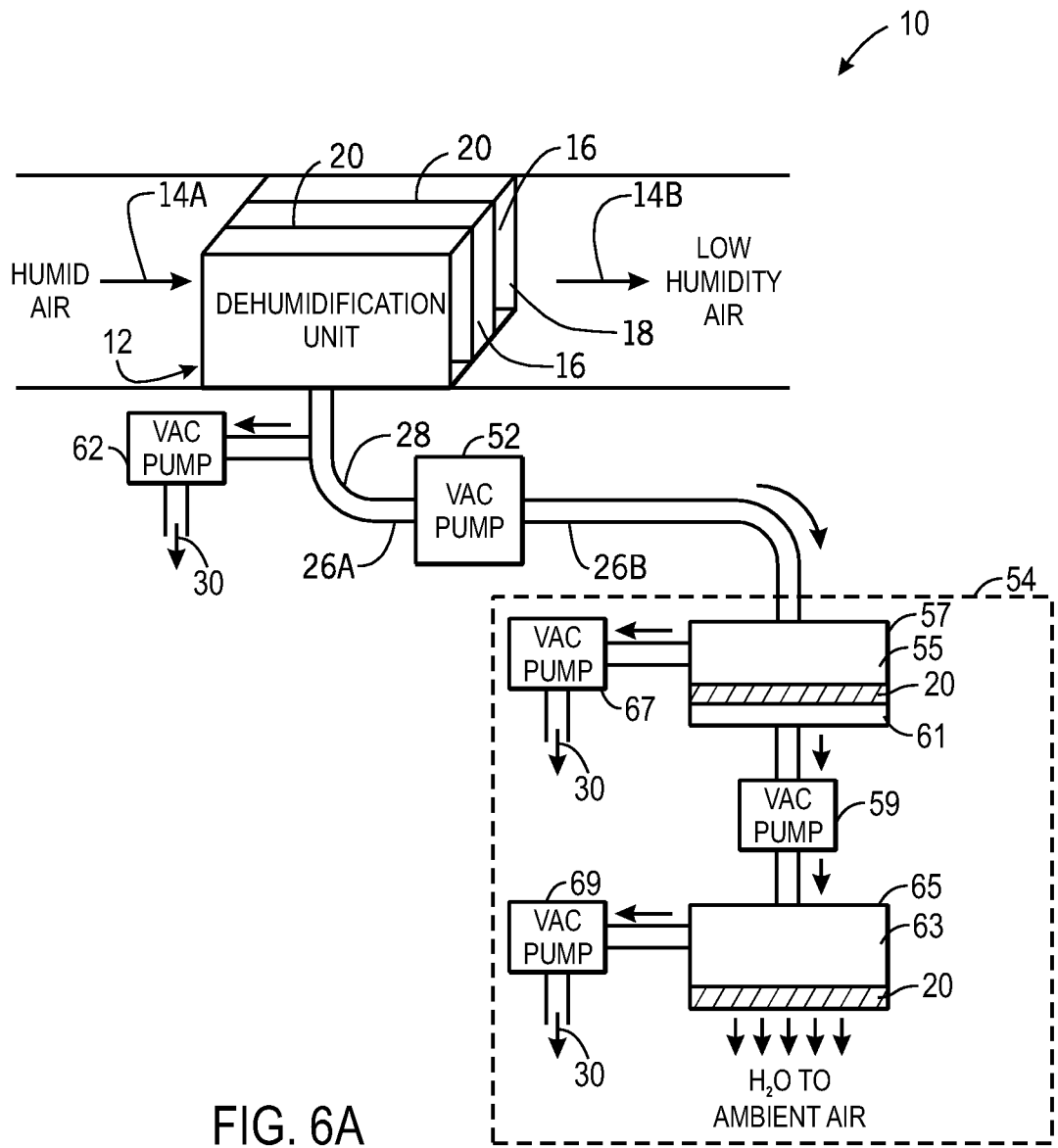
FIG. 6A is a schematic diagram of the HVAC system and the dehumidification unit of FIG. 1 having a vacuum pump for removing other air components (e.g., noncondensable components) from the water vapor in the water vapor extraction chamber of the dehumidification unit in accordance with an embodiment of the present disclosure.

In certain embodiments, a second vacuum pump 62 as shown in FIG. 6A, may be used to periodically or continuously purge the other components 30 from the water vapor vacuum volume 28. FIG. 6A is a schematic diagram of the HVAC system 10 and the dehumidification unit 12 of FIG. 1 having a vacuum pump 62 for removing other air components 30 from the water vapor 26A in the water vapor vacuum volume 28 of the dehumidification unit 12 in accordance with an embodiment of the present disclosure. The vacuum pump 62 may, in certain embodiments, be the same pump used to evacuate the water vapor vacuum volume 28 (as well as the water vapor channels 18, the water vapor outlets 22, and the water vapor manifold 24) to create the lower partial pressure of water vapor described previously that facilitates the passage of the $H_2O$ through the interfaces 20 from the air channels 16 to the water vapor channels 18. However, in other embodiments, the vacuum pump 62 may be different from the pump used to evacuate the water vapor vacuum volume 28 to create the lower partial pressure of water vapor.

Figure 6B:
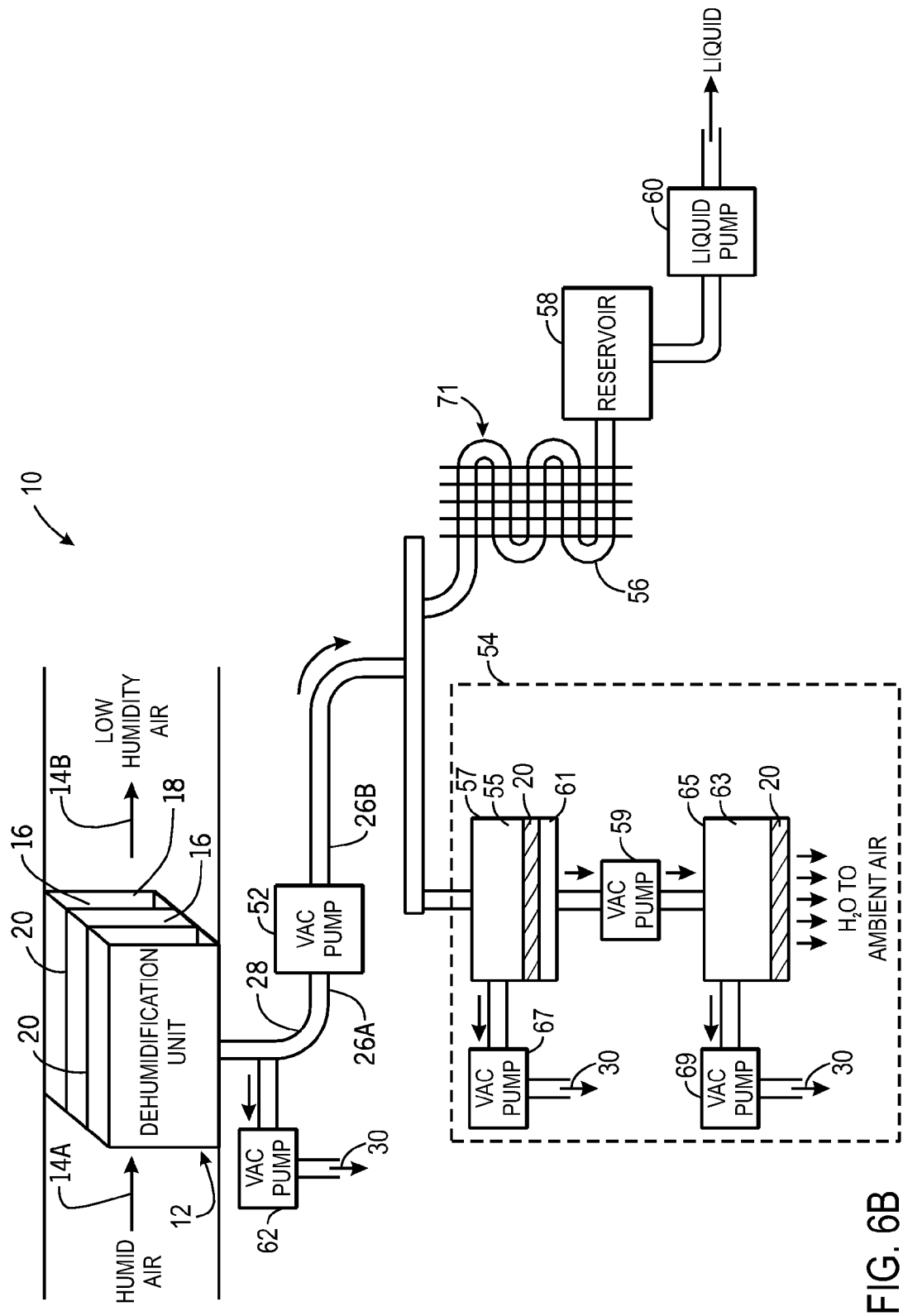
FIG. 6B is a schematic diagram of the HVAC system and the dehumidification unit of FIG. 6A having an additional condenser in accordance with an embodiment of the present disclosure.

FIG. 6B is a schematic diagram of an embodiment the HVAC system 10 with of FIG. 6A with the addition of a condensation unit 71 that may be disposed in parallel with the water vapor rejection system 54. The condensation unit 54 may include a condensation coil 56, a pipe/tube condenser, a flat plate condenser, or any other suitable system for causing a temperature below the condensation point of the water vapor 26B. The condensation unit 71 may either be air cooled or water cooled. For example, in certain embodiments, the condensation unit 71 may be cooled by ambient air or water from a cooling tower. As such, the costs of operating the condensation unit 71 may be relatively low, inasmuch as both ambient air and cooling tower water are in relatively limitless supply.

Once the water vapor 26B has been condensed into a liquid state, in certain embodiments, the liquid water from the condensation unit 71 may be directed into a reservoir 58 for temporary storage of saturated vapor and liquid water. However, in other embodiments, no reservoir 58 may be used. In either case, the liquid water from the condensation unit 71 may be directed into a liquid pump 60 (i.e., a water transport device), within which the pressure of the liquid water from the condensation unit 71 is increased to approximately atmospheric pressure (i.e., approximately 14.7 psia) so that the liquid water may be rejected at ambient conditions. As such, the liquid pump 60 may be sized just large enough to increase the pressure of the liquid water from the condensation unit 54 to approximately atmospheric pressure. Therefore, the costs of operating the liquid pump 60 may be relatively low. In addition, the liquid water from the liquid pump 60 may be at a slightly elevated temperature due to the increase in the pressure of the liquid water. As such, in certain embodiments, the heated liquid water may be transported for use as domestic hot water, further increasing the efficiency of the system by recapturing the heat transferred into the liquid water. By combining the water vapor rejection system 54 of the condensation unit 71, it may be possible to gain additional benefits, including extracting additional liquid water from the HVAC system 10. Accordingly, it is to be noted that any embodiment that includes the water rejection system 54 may additionally include the condensation unit 71, or vice versa.

Figure 7:
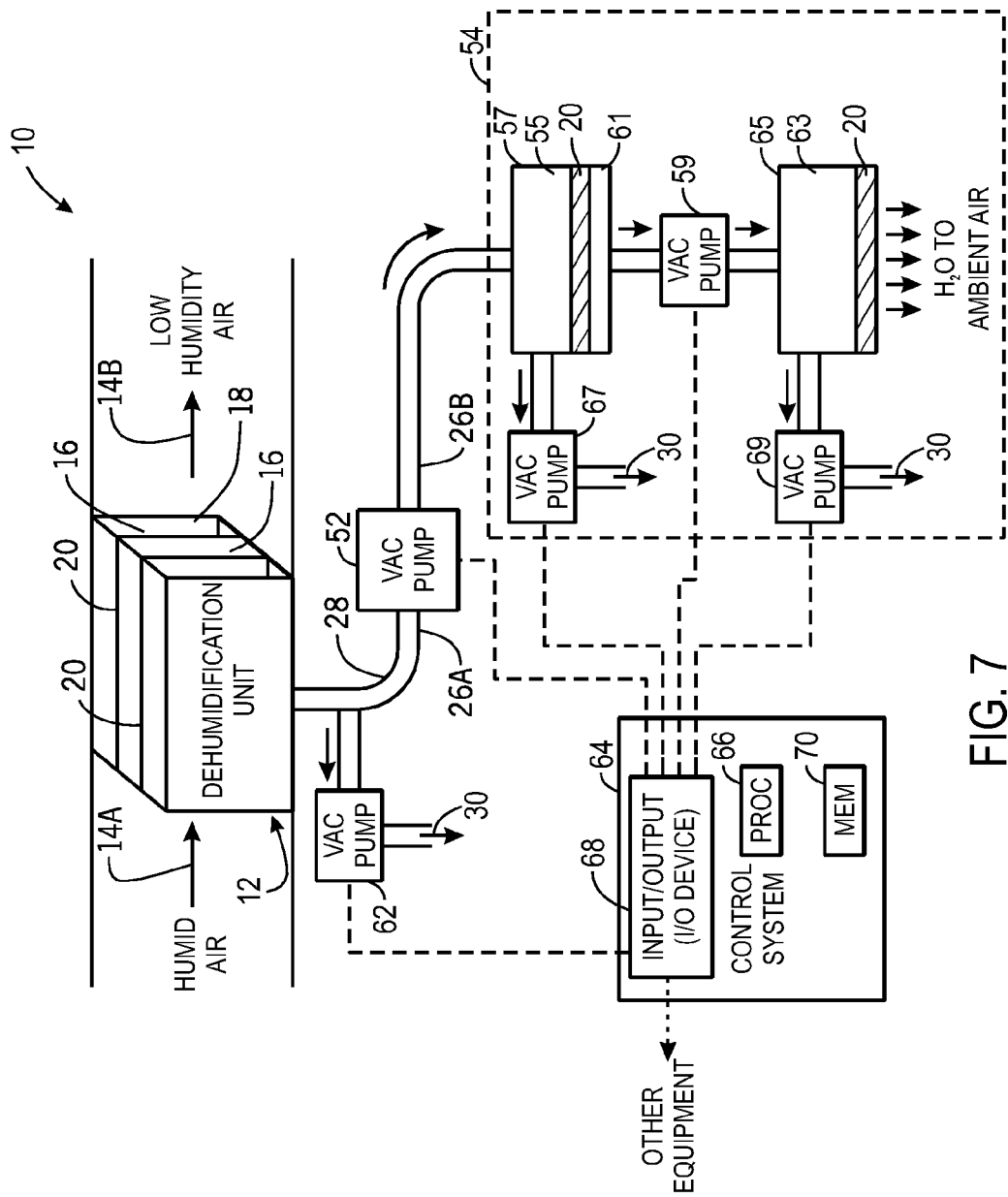
FIG. 7 is a schematic diagram of the HVAC system and the dehumidification unit of FIG. 6 having a control system for controlling various operating conditions of the HVAC system and the dehumidification unit in accordance with an embodiment of the present disclosure.

The dehumidification unit 12 described herein may also be controlled between various operating states, and modulated based on operating conditions of the dehumidification unit 12. For example, FIG. 7 is a schematic diagram of the HVAC system 10 and the dehumidification unit 12 of FIG. 6A having a control system 64 for controlling various operating conditions of the HVAC system 10 and the dehumidification unit 12 in accordance with an embodiment of the present disclosure. The control system 64 may include one or more processors 66, for example, one or more "general-purpose" microprocessors, one or more special-purpose microprocessors and/or ASICS (application-specific integrated circuits), or some combination of such processing components. The processors 66 may use input/output (I/O) devices 68 to, for example, receive signals from and issue control signals to the components of the dehumidification unit 12 (i.e., the vacuum pumps 52, 62, the water vapor rejection system 54, including but not limited to pumps 59, 67, 69), and other equipment such as a fan blowing the inlet air 14A through the dehumidification unit 12, sensors configured to generate signals related to characteristics of the inlet and outlet air 14A, 14B, and so forth). The processors 66 may take these signals as inputs and calculate how to control the functionality of these components of the dehumidification unit 12 to most efficiently remove the water vapor 26 from the air 14 flowing through the dehumidification unit 12. The control system 64 may also include a nontransitory computer-readable medium (i.e., a memory 70) which, for example, may store instructions or data to be processed by the one or more processors 66 of the control system 64.

For example, the control system 64 may be configured to control the rate of removal of the other air components 30 of the water vapor 26A from the water vapor vacuum volume 28 of the dehumidification unit 12 by turning the vacuum pump 62 on or off, or by modulating the rate at which the vacuum pump 62 removes the other air components 30 of the water vapor 26A. More specifically, in certain embodiments, the control system 64 may receive signals from a sensor in the water vapor vacuum volume 28 that detects when too many other air components 30 are present in the water vapor 26A contained in the water vapor vacuum volume 28. This process of other air component removal may operate in a cyclical manner. In "normal" operation of removing the water vapor 26 from the air 14, the vacuum pump 62 will not be in operation. As the other air components 30 build up in the water vapor vacuum volume 28, the internal pressure in the water vapor vacuum volume 28 will eventually reach a setpoint. At this point in time, the vacuum pump 62 will turn on and remove all components (i.e., both the other air components 30 as well as H$_2$O, including the water vapor) until the internal pressure in the water vapor vacuum volume 28 reaches another setpoint (e.g., lower than the starting vacuum pressure). Then, the vacuum pump 62 shuts off and the dehumidification unit 12 returns to the normal operational mode. Setpoints may either be preset or dynamically determined. A preferred method will be to have the vacuum pump 62 only operating in the purge mode intermittently. The "other equipment," as depicted may include one or more fans controlled by the controller 64. The fans may be useful in driving air through membranes 20.

Another example of the type of control that may be accomplished by the control system 64 is modulating the lower partial pressure of the water vapor 26A in the water vapor vacuum volume 28 (as well as the water vapor channels 18, the water vapor outlets 22, and the water vapor manifold 24) to modify the water vapor removal capacity and efficiency ratio of the dehumidification unit 12. For example, the control system 64 may receive signals from pressure sensors in the water vapor vacuum volume 28, the water vapor channels 18, the water vapor outlets 22, and/or the water vapor manifold 24, as well as signals generated by sensors relating to characteristics (e.g., temperature, pressure, flow rate, relative humidity, and so forth) of the inlet and outlet air 14A, 14B, among other things. The control system 64 may use this information to determine how to modulate the lower partial pressure of the water vapor 26A (e.g., with respect to the partial pressure of water vapor in the air 14 flowing through the air channels 16) to increase or decrease the rate of removal of water vapor 26 from the air channels 16 to the water vapor channels 18 through the interfaces 20.

For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, in certain embodiments, the amount of dehumidification (i.e., water vapor removal) may be cycled to improve the efficiency of the dehumidification unit 12. More specifically, under certain operating conditions, the dehumidification unit 12 may function more efficiently at higher rates of water vapor removal. As such, in certain embodiments, the dehumidification unit 12 may be cycled to remove a maximum amount of water vapor from the air 14 for a while (e.g., approximately 1 sec, 10 sec, 100 sec, 10 min), then to remove relatively no water vapor from the air 14 for a while e.g., approximately 1 sec, 10 sec, 100 sec, 10 min), then to remove a maximum amount of water vapor from the air 14 for a while e.g., approximately 1 sec, 10 sec, 100 sec, 10 min), and so forth. In other words, the dehumidification unit 12 may be operated at full water vapor removal capacity for periods of time alternating with other periods of time where no water vapor is removed. In addition, the control system 64 may be configured to control start-up and shutdown sequencing of the dehumidification unit 12.

The dehumidification unit 12 may be designed and operated in many various modes, and at varying operating conditions. In general, the dehumidification unit 12 will be operated with the water vapor vacuum volume 28 (as well as the water vapor channels 18, the water vapor outlets 22, and the water vapor manifold 24) at a water vapor partial pressure below the water vapor partial pressure of the air 14 flowing through the air channels 16. In certain embodiments, the dehumidification unit 12 may be optimized for dedicated outside air system (DOAS) use, wherein the air 14 may have a temperature in the range of approximately 55-100° F., and a relative humidity in the range of approximately 55-100%. In other embodiments, the dehumidification unit 12 may be optimized for residential use for recirculated air having a temperature in the range of approximately 70-85° F., and a relative humidity in the range of approximately 55-65%. Similarly, in certain embodiments, the dehumidification unit 12 may be optimized for dehumidifying outside air in commercial building recirculated air systems, which dehumidifies the inlet air 14A having a temperature in the range of approximately 55-110° F., and a relative humidity in the range of approximately 55-100%. The outlet air 14B has less humidity and about the same temperature as the inlet air 14A, unless cooling is performed on the outlet air 14B.

The dehumidification unit 12 described herein uses less operating power than conventional dehumidification systems because of the relatively low pressures that are used to dehumidify the air 14A. This is due at least in part to the ability of the interfaces 20 (i.e., water vapor permeable membranes) to remove the water vapor 26 from the air 14 efficiently without using excessive pressures to force the water vapor 26 through the interfaces 20. For example, in one embodiment, the minimal power needed to operate the dehumidification unit 12 includes only the fan power used to move the air 14 through the dehumidification unit 12, the compressive power of the vacuum pump 52 to compress the water vapor 26 to approximately the partial pressure of water vapor in the ambient air, for example, to approximately 1.0 psia, or to a pressure that corresponds to a given vapor rejection rate through the water vapor rejection system 54 and the power of the vacuum pump 62 to purge other air components 30 that leak into the water vapor vacuum volume 28 of the dehumidification unit 12. As such, the only relatively major power component used to operate the dehumidification unit 12 is the compressive power of the vacuum pump 52 to compress the water vapor 26 to approximately the partial pressure of water vapor in the ambient air, for example, only to approximately 1.0 psia, or to a pressure that corresponds to a given vapor rejection rate through the water vapor rejection system 54. As mentioned previously, this power is relatively low and, therefore, operating the dehumidification unit 12 is relatively inexpensive as opposed to conventional refrigeration compression dehumidification systems. Moreover, calculations for an embodiment indicate that the dehumidification unit 12 has a coefficient of performance (COP) at least twice as high (or even up to five times as high, depending on operating conditions) as these conventional dehumidification systems. In addition, the dehumidification unit 12 enables the dehumidification of air without reducing the temperature of the air below the temperature at which the air is needed, as is often done in conventional dehumidification systems.

Figure 8:
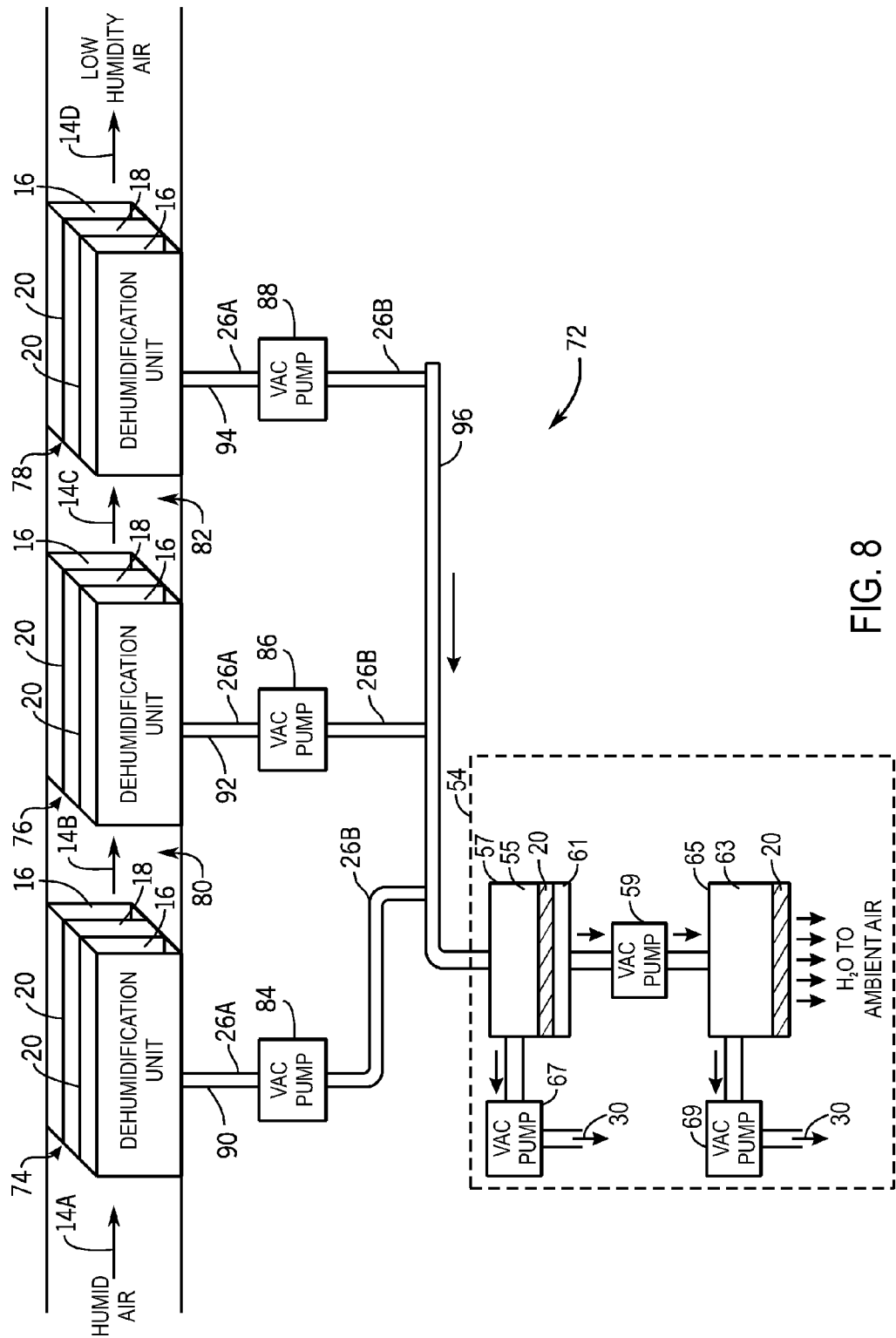
FIG. 8 is a schematic diagram of an HVAC system having a plurality of dehumidification units arranged in series in accordance with an embodiment of the present disclosure.

In certain embodiments, multiple instances of the dehumidification unit 12 described previously with respect to FIGS. 1 through 7 may be used in a single HVAC system. For example, FIG. 8 is a schematic diagram of an HVAC system 72 having a plurality of dehumidification units 12 (i.e., a first dehumidification unit 74, a second dehumidification unit 76, and a third dehumidification unit 78) arranged in series in accordance with an embodiment of the present disclosure. Although illustrated as having three dehumidification units 74, 76, 78 in series, any number of dehumidification units 12 may indeed be used in series in the HVAC system 72. For example, in other embodiments, 2, 4, 5, 6, 7, 8, 9, 10, or even more dehumidification units 12 may be used in series in the HVAC system 72.

The HVAC system 72 of FIG. 8 generally functions the same as the HVAC system 10 of FIGS. 1, 6, and 7. More specifically, as illustrated in FIG. 8, the HVAC system 72 receives the inlet air 14A having a relatively high humidity. However, the relatively dry air 14B from the first dehumidification unit 74 is not expelled into the atmosphere. Rather, as illustrated in FIG. 8, the air 14B expelled from the first dehumidification unit 74 is directed into the second dehumidification unit 76 via a first duct 80. Similarly, air 14C expelled from the second dehumidification unit 76 is directed into the third dehumidification unit 78 via a second duct 82. Outlet air 14D from the third dehumidification unit 78 is then expelled into the conditioned space. Because the dehumidification units 74, 76, 78 of the HVAC system 72 are arranged in series, each successive airstream will be relatively dryer than the upstream airstreams. For example, outlet air 14D is dryer than air 14C, which is dryer than air 14B, which is dryer than inlet air 14A.

As illustrated, many of the components of the HVAC system 72 of FIG. 8 may be considered identical to the components of the HVAC system 10 of FIGS. 1, 6, and 7. For example, as described previously, the dehumidification units 74, 76, 78 of the HVAC system 72 of FIG. 8 may be considered identical to the dehumidification units 12 of FIGS. 1, 6, and 7. In addition, the HVAC system 72 of FIG. 8 also includes the water vapor rejection system 54 that receives water vapor 26B having a partial pressure just high enough to facilitate water vapor rejection to ambient air, as described previously.

As illustrated in FIG. 8, in certain embodiments, each dehumidification unit 74, 76, 78 may be associated with a respective vacuum pump 84, 86, 88, each of which is similar in functionality to the vacuum pump 52 of FIGS. 1, 6, and 7. However, because water vapor is removed from each successive dehumidification unit 74, 76, 78, the partial pressure of water vapor in the air 14 will be gradually reduced at each successive dehumidification unit 74, 76, 78. For example, as described previously, the partial pressure of water vapor in the inlet air 14A may be in the range of approximately 0.2-1.0 psia; the partial pressure of water vapor in the air 14B from the first dehumidification unit 74 may be in the range of approximately 0.17-0.75 psia (accomplishing approximately ⅓ of the drop); the partial pressure of water vapor in the air 14C from the second dehumidification unit 76 may be in the range of approximately 0.14-0.54 psia (accomplishing approximately the next ⅓ of the drop); and the partial pressure of water vapor in the outlet air 14D from the third dehumidification unit 78 may be in the range of approximately 0.10-0.25 psia, which is consistent with a 60° F. saturation temperature or lower. The very low values may be used to increase capacity for occasional use.

As such, in certain embodiments, the partial pressure of water vapor in the water vapor vacuum volumes 90, 92, 94 (e.g., that are similar in functionality to the water vapor vacuum volume 28 described previously) associated with each respective vacuum pump 84, 86, 88 may be modulated to ensure an optimal flow of water vapor 26 from each respective dehumidification unit 74, 76, 78. For example, the partial pressure of the water vapor 26A in the water vapor vacuum volume 28 described previously may be maintained in a range of approximately 0.15-0.25 psia. However, in the HVAC system 72 of FIG. 8, the partial pressure of the water vapor 26A in the first water vapor vacuum volume 90 may be maintained in a range of approximately 0.15-0.7 psia, the partial pressure of the water vapor 26A in the second water vapor vacuum volume 92 may be maintained in a range of approximately 0.12-0.49 psia, and the partial pressure of the water vapor 26A in the third water vapor vacuum volume 94 may be maintained in a range of approximately 0.09-0.24 psia. Regardless, it may be expected that the amount of water vapor 26 to be removed in each successive dehumidification unit 74, 76, 78, will generally be optimized to minimize energy used to operate the system.

In certain embodiments, each of the vacuum pumps 84, 86, 88 may compress the water vapor 26 and direct it into a common manifold 96 having a substantially constant partial pressure of water vapor (i.e., just high enough to facilitate water vapor rejection in the water vapor rejection system 54) such that the water vapor 26 flows in a direction opposite to the flow of the air 14. In other embodiments, the water vapor 26 extracted from each successive dehumidification unit 74, 76, 78 may be compressed by its respective vacuum pump 84, 86, 88 and then combined with the water vapor 26 extracted from the next upstream dehumidification unit 74, 76, 78. For example, in other embodiments, the water vapor 26 from the third dehumidification unit 78 may be compressed by the third vacuum pump 88 and then combined with the water vapor 26 from the second dehumidification unit 76 in the second water vapor vacuum volume 92. Similarly, the water vapor 26 compressed by the second vacuum pump 86 may be combined with the water vapor 26 from the first dehumidification unit 74 in the first water vapor vacuum volume 90. In this embodiment, the exhaust side of each successive vacuum pump 84, 86, 88 increases the partial pressure of the water vapor 26 only to the operating pressure of the next upstream vacuum pump 84, 86, 88. For example, the third vacuum pump 88 may only increase the pressure of the water vapor 26 to approximately 0.2 psia if the partial pressure of water vapor in the second water vapor vacuum volume 92 is approximately 0.2 psia. Similarly, the second vacuum pump 86 may only increase the pressure of the water vapor 26 to approximately 0.35 psia if the partial pressure of water vapor in the first water vapor vacuum volume 90 is approximately 0.35 psia. In this embodiment, the water vapor 26 compressed by the first vacuum pump 84 will be directed into the membrane water vapor rejection system 54 at a partial pressure of water vapor just high enough to facilitate water vapor rejection.

It should be noted that the specific embodiment illustrated in FIG. 8 having a plurality of dehumidification units 74, 76, 78 arranged in series may be configured in various ways not illustrated in FIG. 8. For example, although illustrated as using a respective vacuum pump 84, 86, 88 with each dehumidification unit 74, 76, 78, in certain embodiments, a single vacuum pump 52 may be used with multiple inlet ports connected to the first, second, and third water vapor vacuum volumes 90, 92, 94. In addition, although illustrated as using a single membrane water vapor rejection system 54, to reject the water vapor 26B into the ambient air, in other embodiments, each set of dehumidification units 74, 76, 78 and vacuum pumps 84, 86, 88 may be operated independently and be associated with their own respective membrane water vapor rejection system 54.

In addition, the control system 64 of FIG. 7 may also be used in the HVAC system 72 of FIG. 8 to control the operation of the HVAC system 72 in a similar manner as described previously with respect to FIG. 7. For example, as described previously, the control system 64 may be configured to control the rate of removal of the other air components 30 of the water vapor 26 in the water vapor vacuum volumes 90, 92, 94 by turning the vacuum pumps 84, 86, 88 (or separate vacuum pumps 62, as described previously with respect to FIGS. 6 and 7) on or off, or by modulating the rate at which the vacuum pumps 84, 86, 88 (or separate vacuum pumps 62, as described previously with respect to FIGS. 6 and 7) remove the other air components 30. More specifically, in certain embodiments, the control system 64 may receive signals from sensors in the water vapor vacuum volumes 90, 92, 94 that detect when too many other air components 30 are present in the water vapor 26A contained in the water vapor vacuum volumes 90, 92, 94.

In addition, the control system 64 may modulate the lower partial pressure of the water vapor 26A in the water vapor vacuum volumes 90, 92, 94 to modify the water vapor removal capacity and efficiency ratio of the dehumidification units 74, 76, 78. For example, the control system 64 may receive signals from pressure sensors in the water vapor vacuum volumes 90, 92, 94, the water vapor channels 18, as well as signals generated by sensors relating to characteristics (e.g., temperature, pressure, flow rate, relative humidity, and so forth) of the air 14, among other things. The control system 64 may use this information to determine how to modulate the lower partial pressure of the water vapor 26A in the water vapor vacuum volumes 90, 92, 94 to increase or decrease the rate of removal of water vapor 26 from the air channels 16 to the water vapor channels 18 through the interfaces 20 of the dehumidification units 74, 76, 78 as $H_2O$ (i.e., as water molecules, gaseous water vapor, liquid water, adsorbed/desorbed water molecules, absorbed/absorbed water molecules, and so forth, through the interfaces 20).

For example, if more water vapor removal is desired, the lower partial pressure of the water vapor 26A in the water vapor vacuum volumes 90, 92, 94 may be reduced and, conversely, if less water vapor removal is desired, the lower partial pressure of the water vapor 26A in the water vapor vacuum volumes 90, 92, 94 may be increased. Furthermore, as described above, the amount of dehumidification (i.e., water vapor removal) may be cycled to improve the efficiency of the dehumidification units 74, 76, 78. More specifically, under certain operating conditions, the dehumidification units 74, 76, 78 may function more efficiently at higher rates of water vapor removal. As such, in certain embodiments, the dehumidification units 74, 76, 78 may be cycled to remove a maximum amount of water vapor from the air 14 for a while (e.g., approximately 1 sec, 10 sec, 100 sec, 10 min), then to remove relatively no water vapor from the air 14 for a while (e.g., approximately 1 sec, 10 sec, 100 sec, 10 min), then to remove a maximum amount of water vapor from the air 14 for a while (e.g., approximately 1 sec, 10 sec, 100 sec, 10 min), and so forth. In other words, the dehumidification units 74, 76, 78 may be operated at full water vapor removal capacity for periods of time alternating with other periods of time where no water vapor is removed. In addition, the control system 64 may be configured to control start-up and shut-down sequencing of the dehumidification units 74, 76, 78.

Figure 9:
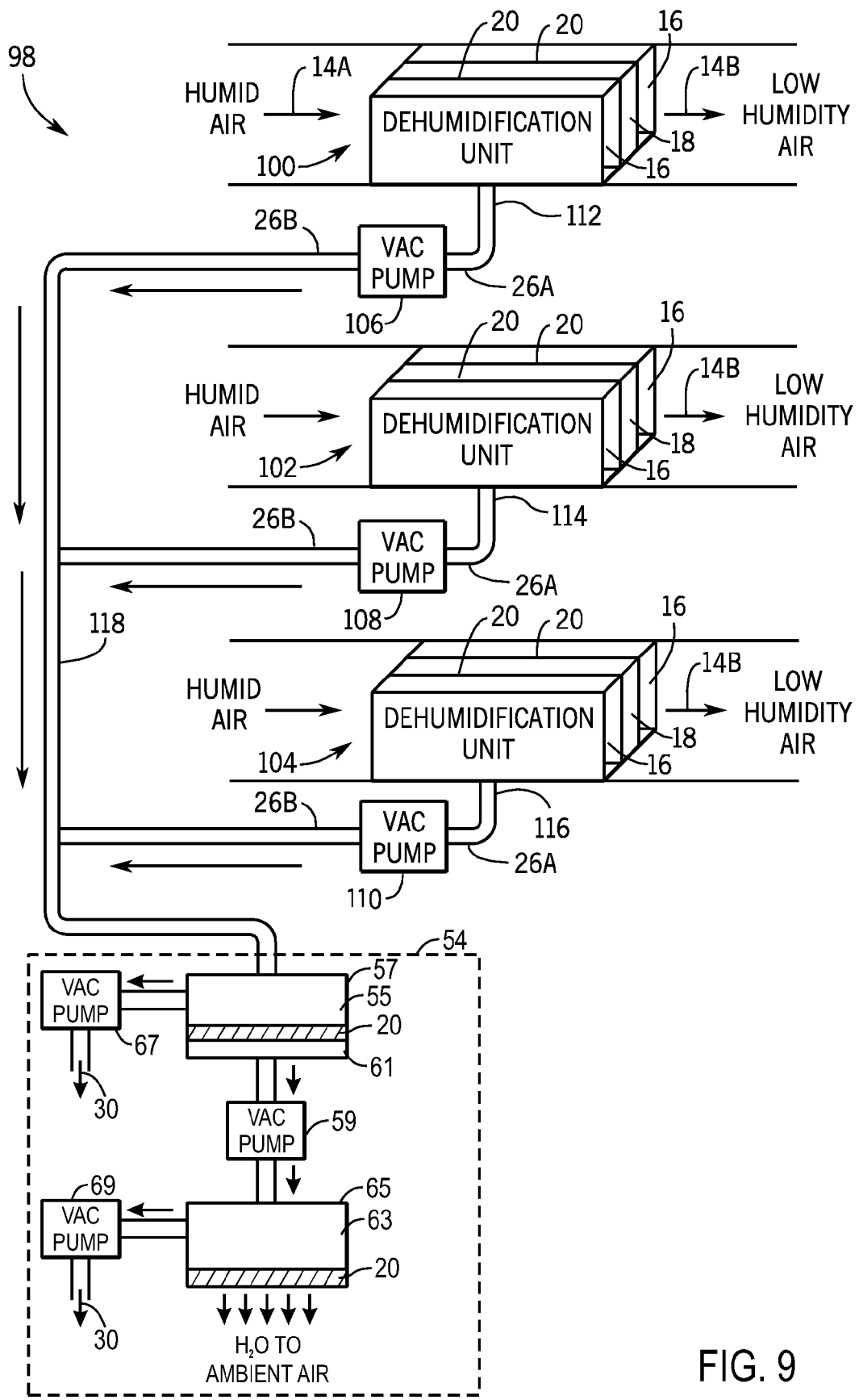
FIG. 9 is a schematic diagram of an HVAC system having a plurality of dehumidification units arranged in parallel in accordance with an embodiment of the present disclosure.

While FIG. 8 includes a serial arrangement of multiple dehumidification units 12, present embodiments include other ways in which multiple dehumidification units 12 may be arranged in a single HVAC system. For example, FIG. 9 is a schematic diagram of an HVAC system 98 having a plurality of dehumidification units 12 (i.e., a first dehumidification unit 100, a second dehumidification unit 102, and a third dehumidification unit 104) arranged in parallel in accordance with an embodiment of the present disclosure. Although illustrated as having three dehumidification units 100, 102, 104 in parallel, any number of dehumidification units 12 may indeed be used in parallel in the HVAC system 98. For example, in other embodiments, 2, 4, 5, 6, 7, 8, 9, 10, or even more dehumidification units 12 may be used in parallel in the HVAC system 98.

The HVAC system 98 of FIG. 9 generally functions the same as the HVAC system 10 of FIGS. 1, 6, and 7 and the HVAC system 72 of FIG. 8. More specifically, as illustrated in FIG. 9, each dehumidification unit 100, 102, 104 of the HVAC system 98 receives the inlet air 14A having a relatively high humidity and expels the outlet air 14B having a relatively low humidity. As illustrated, many of the components of the HVAC system 98 of FIG. 9 may be considered identical to the components of the HVAC system 10 of FIGS. 1, 6, and 7 and the HVAC system 72 of FIG. 8. For example, the dehumidification units 100, 102, 104 of the HVAC system 98 of FIG. 9 may be considered identical to the dehumidification units 12 of FIGS. 1, 6, and 7 and the dehumidification units 74, 76, 78 of FIG. 8. In addition, the HVAC system 98 of FIG. 9 also includes the membrane water vapor rejection system 54 that receives water vapor 26B having a partial pressure just high enough to facilitate membrane water vapor rejection, as described previously.

As illustrated in FIG. 9, in certain embodiments, each dehumidification unit 100, 102, 104 may be associated with a respective vacuum pump 106, 108, 110, each of which is similar in functionality to the vacuum pump 52 of FIGS. 1, 6, and 7 and the vacuum pumps 84, 86, 88 of FIG. 8. However, as opposed to the HVAC system 72 of FIG. 8, because the dehumidification units 100, 102, 104 and associated vacuum pumps 106, 108, 110 are arranged in parallel, the partial pressure of water vapor in the air 14 will be approximately the same in each dehumidification unit 100, 102, 104. As such, in general, the partial pressure of water vapor in the water vapor vacuum volumes 112, 114, 116 associated with each respective vacuum pump 106, 108, 110 will also be approximately the same. For example, as described previously with respect to the HVAC system 10 of FIGS. 1, 6, and 7, the partial pressure of the water vapor 26A in the water vapor vacuum volumes 112, 114, 116 may be maintained in a range of approximately 0.10-0.25 psia.

As illustrated in FIG. 9, in certain embodiments, each of the vacuum pumps 106, 108, 110 may compress the water vapor 26 and direct it into a common manifold 118 having a substantially constant partial pressure of water vapor (i.e., just high enough to facilitate membrane water vapor rejection in the water vapor rejection system 54). In other embodiments, the water vapor 26 extracted from each successive dehumidification unit 100, 102, 104 (i.e., from top to bottom) may be compressed by its respective vacuum pump 106, 108, 110 and then combined with the water vapor 26 extracted from the next downstream (i.e., with respect to the common manifold) dehumidification unit 100, 102, 104. For example, in other embodiments, the water vapor 26 from the first dehumidification unit 100 may be compressed by the first vacuum pump 106 and then combined with the water vapor 26 from the second dehumidification unit 102 in the second water vapor vacuum volume 114. Similarly, the water vapor 26 compressed by the second vacuum pump 108 may be combined with the water vapor 26 from the third dehumidification unit 104 in the third water vapor vacuum volume 116. In this embodiment, the exhaust side of each successive vacuum pump 106, 108, 110 increases the partial pressure of the water vapor 26 only to the operating pressure of the next downstream vacuum pump 106, 108, 110. For example, the first vacuum pump 106 may only increase the pressure of the water vapor 26 to approximately 0.2 psia if the partial pressure of water vapor in the second water vapor vacuum volume 114 is approximately 0.2 psia. Similarly, the second vacuum pump 108 may only increase the pressure of the water vapor 26 to approximately 0.35 psia if the partial pressure of water vapor in the third water vapor vacuum volume 116 is approximately 0.35 psia. In this embodiment, the water vapor 26 compressed by the third vacuum pump 110 will be directed into the membrane water vapor rejection system 54 at a partial pressure of water vapor just high enough to facilitate water vapor rejection to ambient air.

It should be noted that the specific embodiment illustrated in FIG. 9 having a plurality of dehumidification units 100, 102, 104 arranged in parallel may be configured in various ways not illustrated in FIG. 9. For example, although illustrated as using a respective vacuum pump 106, 108, 110 with each dehumidification unit 100, 102, 104, in certain embodiments, a single vacuum pump 52 may be used with multiple inlet ports connected to the first, second, and third water vapor vacuum volumes 112, 114, 116. In addition, although illustrated as using a single membrane water vapor rejection system 54, to reject the water vapor 26B to ambient air in other embodiments, each set of dehumidification units 100, 102, 104 and vacuum pumps 106, 108, 110 may be operated independently and be associated with their own respective membrane water vapor rejection systems 54.

In addition, the control system 64 of FIG. 7 may also be used in the HVAC system 98 of FIG. 9 to control the operation of the HVAC system 98 in a similar manner as described previously with respect to FIG. 7. For example, as described previously, the control system 64 may be configured to control the rate of removal of the other air components 30 of the water vapor 26A in the water vapor vacuum volumes 112, 114, 116 by turning the vacuum pumps 106, 108, 110 (or separate vacuum pumps 62, as described previously with respect to FIGS. 6 and 7) on or off, or by modulating the rate at which the vacuum pumps 106, 108, 110 (or separate vacuum pumps 62, as described previously with respect to FIGS. 6 and 7) remove the other air components 30. More specifically, in certain embodiments, the control system 64 may receive signals from sensors in the water vapor vacuum volumes 112, 114, 116 that detect when too many other air components 30 are present in the water vapor 26A contained in the water vapor vacuum volumes 112, 114, 116.

In addition, the control system 64 may modulate the lower partial pressure of the water vapor 26A in the water vapor vacuum volumes 112, 114, 116 to modify the water vapor removal capacity and efficiency ratio of the dehumidification units 100, 102, 104. For example, the control system 64 may receive signals from pressure sensors in the water vapor vacuum volumes 112, 114, 116, the water vapor channels 18, as well as signals generated by sensors relating to characteristics (e.g., temperature, pressure, flow rate, relative humidity, and so forth) of the air 14, among other things. The control system 64 may use this information to determine how to modulate the lower partial pressure of the water vapor 26A in the water vapor vacuum volumes 112, 114, 116 to increase or decrease the rate of removal of water vapor 26 from the air channels 16 to the water vapor channels 18 through the interfaces 20 of the dehumidification units 100, 102, 104 as $H_2O$ (i.e., as water molecules, gaseous water vapor, liquid water, adsorbed/desorbed water molecules, absorbed/desorbed water molecules, and so forth, through the interfaces 20).

For example, if more water vapor removal is desired, the lower partial pressure of the water vapor 26A in the water vapor vacuum volumes 112, 114, 116 may be reduced and, conversely, if less water vapor removal is desired, the lower partial pressure of the water vapor 26A in the water vapor vacuum volumes 112, 114, 116 may be increased. Furthermore, as described above, the amount of dehumidification (i.e., water vapor removal) may be cycled to improve the efficiency of the dehumidification units 100, 102, 104. More specifically, under certain operating conditions, the dehumidification units 100, 102, 104 may function more efficiently at higher rates of water vapor removal. As such, in certain embodiments, the dehumidification units 100, 102, 104 may be cycled to remove a maximum amount of water vapor from the air 14 for a while (e.g., approximately 1 sec, 10 sec, 100 sec, 10 min), then to remove relatively no water vapor from the air 14 for a while (e.g., approximately 1 sec, 10 sec, 100 sec, 10 min), then to remove a maximum amount of water vapor from the air 14 for a while (e.g., approximately 1 sec, 10 sec, 100 sec, 10 min), and so forth. In other words, the dehumidification units 100, 102, 104 may be operated at full water vapor removal capacity for periods of time alternating with other periods of time where no water vapor is removed. In addition, the control system 64 may be configured to control start-up and shutdown sequencing of the dehumidification units 100, 102, 104.

Figure 10:
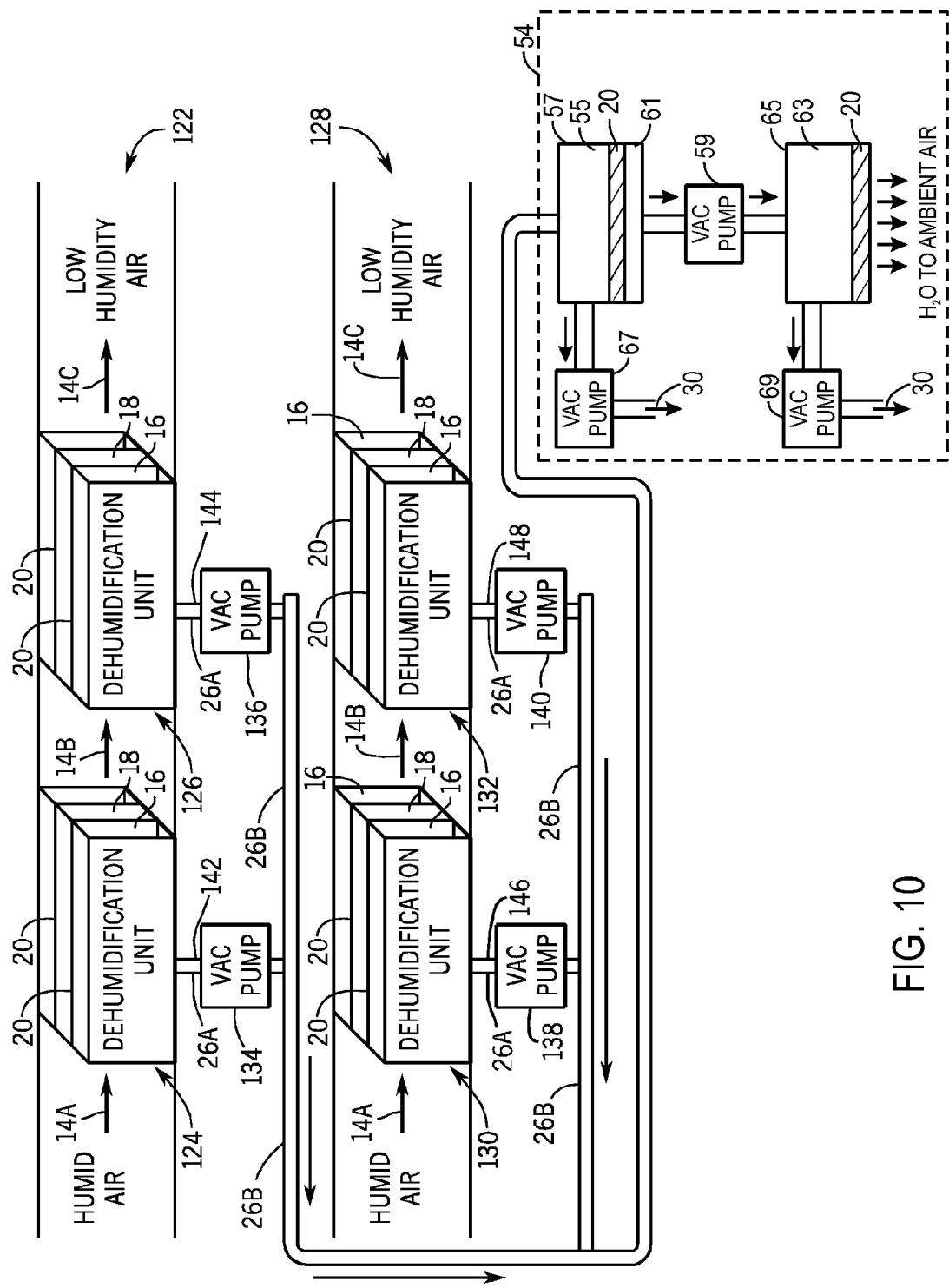
FIG. 10 is a schematic diagram of an HVAC system having a first plurality of dehumidification units arranged in series, and a second plurality of dehumidification units also arranged in series, with the first and second plurality of dehumidification units arranged in parallel in accordance with an embodiment of the present disclosure.

In addition to the serial arrangement of dehumidification units 12 illustrated in FIG. 8 and the parallel arrangement of dehumidification units 12 illustrated in FIG. 9, multiple dehumidification units 12 may be used in other ways. Indeed, much more complex and expansive arrangements may also be used. For example, FIG. 10 is a schematic diagram of an HVAC system 120 having a first set 122 of dehumidification units 12 (i.e., a first dehumidification unit 124 and a second dehumidification unit 126) arranged in series, and a second set 128 of dehumidification units 12 (i.e., a third dehumidification unit 130 and a fourth dehumidification unit 132) also arranged in series, with the first and second sets 122, 128 of dehumidification units 12 arranged in parallel in accordance with an embodiment of the present disclosure. In other words, the first set 122 of serial first and second dehumidification units 124, 126 are arranged in parallel with the second set 128 of serial third and fourth dehumidification units 130, 132.

Although illustrated as having two sets 122, 128 of serial dehumidification units 12 arranged in parallel, any number of parallel pluralities of dehumidification units 12 may indeed be used in the HVAC system 120. For example, in other embodiments, 3, 4, 5, 6, 7, 8, 9, 10, or even more parallel sets of dehumidification units 12 may be used in the HVAC system 120. Similarly, although illustrated as having two dehumidification units 12 arranged in series within each set 122, 128 of dehumidification units 12, any number of dehumidification units 12 may indeed be used in series within each set 122, 128 of dehumidification units 12 in the HVAC system 120. For example, in other embodiments, 1, 3, 4, 5, 6, 7, 8, 9, 10, or even more dehumidification units 12 may be used in series within each set 122, 128 of dehumidification units 12 in the HVAC system 120.

All of the operating characteristics of the HVAC system 120 of FIG. 10 are similar to those described previously with respect to the HVAC systems 72, 98 of FIGS. 8 and 9 (as well as the HVAC system 10 of FIGS. 1, 6, and 7). For example, as illustrated, each of the dehumidification units 124, 126, 130, 132 may be associated with its own respective vacuum pump 134, 136, 138, 140 (e.g., similar to the vacuum pump 52 of FIGS. 1, 6, and 7). However, in other embodiments, one vacuum pump 52 may be used for each set 122, 128 of dehumidification units 12 with multiple inlet ports connected to the respective water vapor vacuum volumes 142, 144, 146, 148. Indeed, in other embodiments, all of the dehumidification units 124, 126, 130, 132 may be associated with a single vacuum pump 52 with multiple inlet ports connected to all of the water vapor vacuum volumes 142, 144, 146, 148.

In addition, although illustrated as using a single membrane water vapor rejection system 54 to reject the water vapor 26B to ambient air, in other embodiments, each set of dehumidification units 124, 126, 130, 132 and vacuum pumps 134, 136, 138, 140 may be operated independently and be associated with their own respective membrane water vapor rejection systems 54. In addition, the control system 64 described previously may also be used in the HVAC system 120 of FIG. 10 to control operation of the HVAC system 120 in a similar manner as described previously.

The embodiments described previously with respect to FIGS. 8 through 10 are slightly more complex than the embodiments described previously with respect to FIGS. 1 through 7 inasmuch as multiple dehumidification units 12 are used in series, parallel, or some combination thereof. As such, the control of pressures and temperatures of the HVAC systems 72, 98, 120 of FIGS. 8 through 10 are slightly more complicated than the control of a single dehumidification unit 12. For example, the partial pressures in the water vapor vacuum volumes may need to be closely monitored and modulated by the control system 64 to take into account variations in temperature and partial pressure of water vapor in the air 14 within the respective dehumidification units 12, operating pressures of adjacent water vapor vacuum volumes and vacuum pumps (which may be cross-piped together as described previously to facilitate control of pressures, flows, and so forth), among other things. In certain embodiments, variable or fixed orifices may be used to control pressures and changes in pressures in and between the dehumidification units 12. In addition, as described previously, each of the respective vacuum pumps may be controlled to adjust the partial pressures of water vapor in the water vapor vacuum volumes to account for variations between dehumidification units 12.

Figure 11:
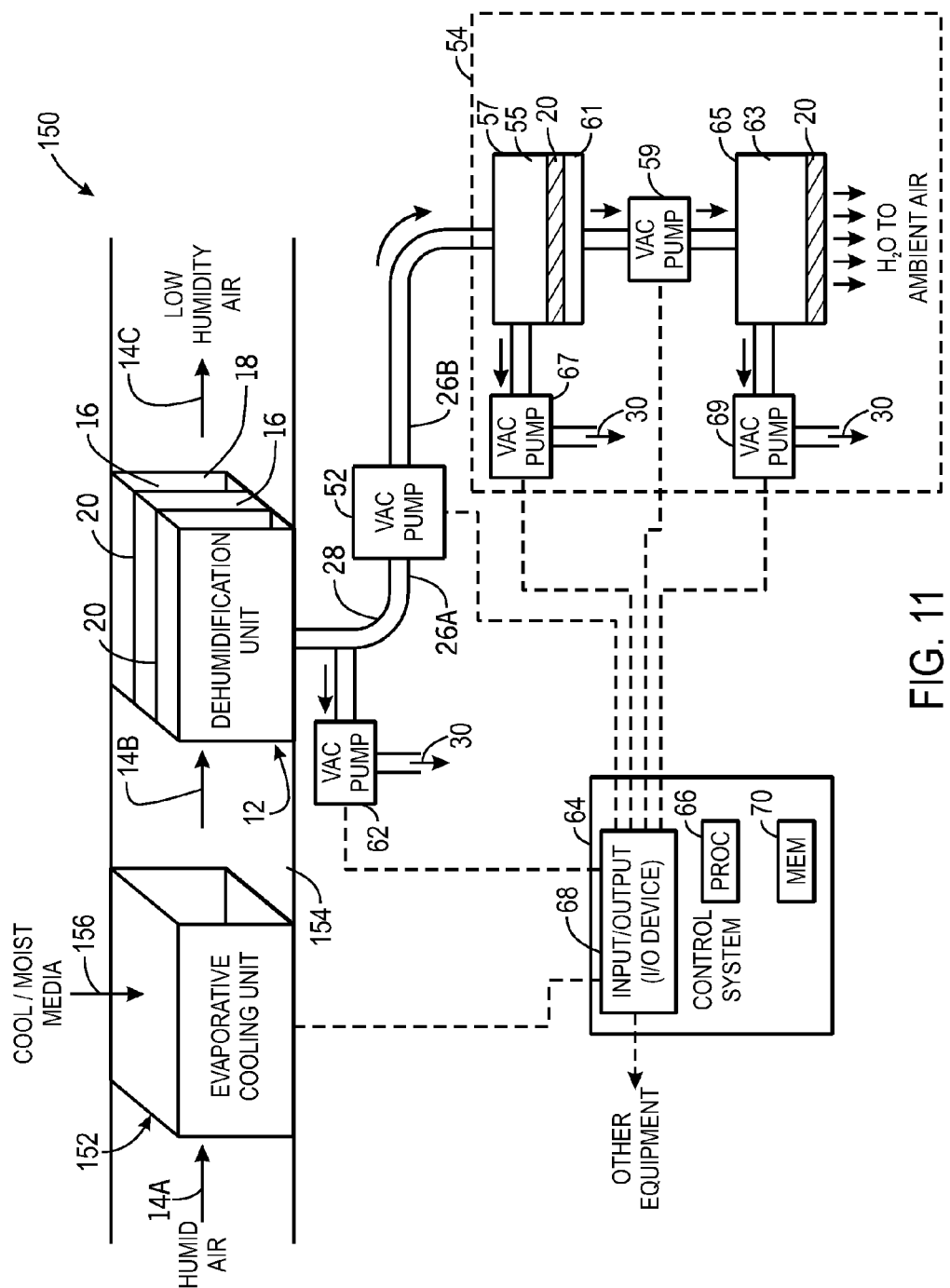
FIG. 11 is a schematic diagram of an HVAC system having an evaporative cooling unit disposed upstream of the dehumidification unit in accordance with an embodiment of the present disclosure.

In certain embodiments, the dehumidification unit 12 described with respect to FIGS. 1 through 7 may be used in conjunction with one or more evaporative cooling units 12. For example, FIG. 11 is a schematic diagram of an HVAC system 150 having an evaporative cooling unit 152 disposed upstream of the dehumidification unit 12 in accordance with an embodiment of the present disclosure. The HVAC system 150 of FIG. 11 generally functions the same as the HVAC system 8 of FIGS. 1, 6, and 7. However, as illustrated in FIG. 11, the HVAC system 150 specifically includes the evaporative cooling unit 152 disposed upstream of the dehumidification unit 12. Thus, the HVAC system 150 first receives the relatively humid inlet air 14A into the evaporative cooling unit 152, instead of the dehumidification unit 12. The evaporative cooling unit 152 reduces the temperature of the relatively humid inlet air 14A and expels cooler (but still relatively humid) air 14B, which is directed into the dehumidification unit 12 via a duct 154. As described previously, the cooler (but still relatively humid) air 14B is then dehumidified in the dehumidification unit 12 and expelled as relatively dry air 14C into the conditioned space.

The evaporative cooling unit 152 of FIG. 11 may either be a direct evaporative cooling unit or an indirect evaporative cooling unit. In other words, when the evaporative cooling unit 152 uses direct evaporative cooling techniques, a relatively cool and moist media 156 (e.g., relatively cool water) is directly added to the relatively humid inlet air 14A. However, when the evaporative cooling unit 152 uses indirect evaporative cooling techniques, the relatively humid air 14A may, for example, flow across one side of a plate of a heat exchanger while the relatively cool and moist media 156 flows across another side of the plate of the heat exchanger. In other words, generally speaking, some of the relatively cool moisture from the relatively cool and moist media 156 is indirectly added to the relatively humid air 14A. Whether direct or indirect evaporative cooling techniques are used in the evaporative cooling unit 152 affects the rate of humidity removal and temperature reduction of the air 14 that flows through the HVAC system 150 of FIG. 11. In general, however, the evaporative cooling unit 152 of FIG. 11 initially cools the air 14 to a temperature as low as possible for the particular application, and the dehumidification unit 12 lowers the humidity ratio at approximately constant temperature.

As illustrated, many of the components of the HVAC system 150 of FIG. 11 may be considered identical to the components of the HVAC system 8 of FIGS. 1, 6, and 7. For example, as described previously, HVAC system 150 of FIG. 11 includes the membrane water vapor rejection system 54 that receives water vapor 26B having a partial pressure just high enough to facilitate water vapor rejection, as described previously. The "other equipment," as depicted may include one or more fans controlled by the controller 64. The fans may be useful in driving air through the membranes 20.

In addition, the control system 64 of FIG. 7 may also be used in the HVAC system 150 of FIG. 11 to control the operation of the HVAC system 150 in a similar manner as described previously with respect to FIG. 7. For example, as described previously, the control system 64 may be configured to control the rate of removal of the other air components 30 of the water vapor 26A in the water vapor vacuum volume 28 by turning the vacuum pump 52 (or separate vacuum pump 62) on or off, or by modulating the rate at which the vacuum pump 52 (or separate vacuum pump 62) removes the other air components 30. More specifically, in certain embodiments, the control system 64 may receive signals from sensors in the water vapor vacuum volume 28 that detect when too many other air components 30 are present in the water vapor 26A contained in the water vapor vacuum volume 28.

In addition, the control system 64 may modulate the lower partial pressure of the water vapor 26A in the water vapor vacuum volume 28 to modify the water vapor removal capacity and efficiency ratio of the dehumidification unit 12. For example, the control system 64 may receive signals from pressure sensors in the water vapor vacuum volume 28, the water vapor channels 18, as well as signals generated by sensors relating to characteristics (e.g., temperature, pressure, flow rate, relative humidity, and so forth) of the air 14 in the evaporative cooling unit 152, the dehumidification unit 12, or both, among other things.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification unit 12 as $H_2O$ (i.e., as water molecules, gaseous water vapor, liquid water, adsorbed/desorbed water molecules, absorbed/desorbed water molecules, and so forth, through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification unit 12. More specifically, under certain operating conditions, the dehumidification unit 12 may function more efficiently at higher rates of water vapor removal. As such, in certain embodiments, the dehumidification unit 12 may be cycled to remove a maximum amount of water vapor from the air 14 for a while (e.g., approximately 1 sec, 10 sec, 100 sec, 10 min), then to remove relatively no water vapor from the air 14 for a while (e.g., approximately 1 sec, 10 sec, 100 sec, 10 min), then to remove a maximum amount of water vapor from the air 14 for a while (e.g., approximately 1 sec, 10 sec, 100 sec, 10 min), and so forth. In other words, the dehumidification unit 12 may be operated at full water vapor removal capacity for periods of time alternating with other periods of time where no water vapor is removed.

Furthermore, the control system 64 may also be configured to control operation of the evaporative cooling unit 152. For example, the control system 64 may selectively modulate how much (direct or indirect) evaporative cooling occurs in the evaporating cooling unit 152. As an example, valves may be actuated to control the flow rate of the relatively cool and moist media 156 through the evaporative cooling unit 152, thereby directly affecting the amount of (direct or indirect) evaporative cooling in the evaporative cooling unit 152. In addition, operation of the evaporative cooling unit 152 and the dehumidification unit 12 may be controlled simultaneously. Furthermore, the control system 64 may be configured to control start-up and shutdown sequencing of the evaporative cooling unit 152 and the dehumidification unit 12.

Figure 12A:
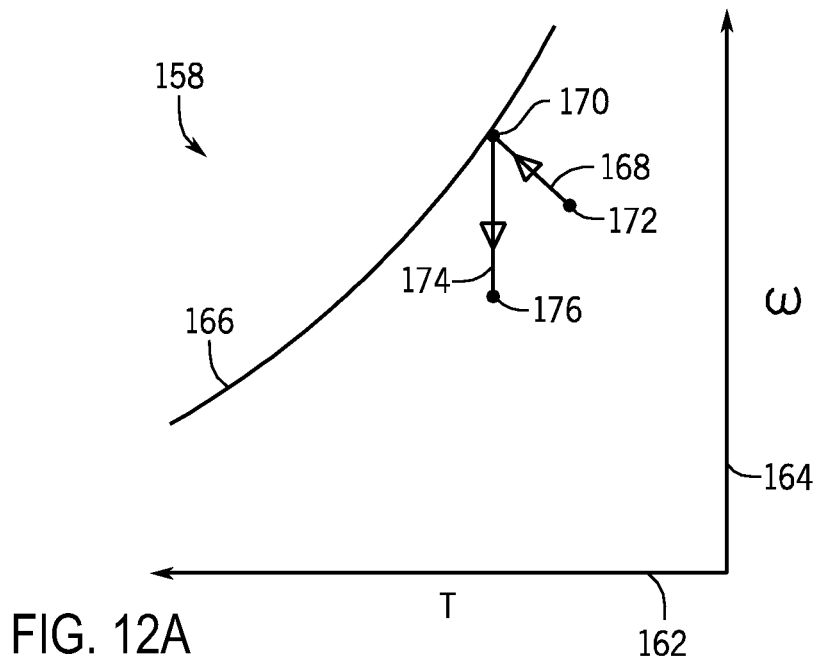
FIG. 12A is a psychrometric chart of the temperature and the humidity ratio of the air flowing through a direct evaporative cooling unit and the dehumidification unit of FIG. 11 in accordance with an embodiment of the present disclosure.
Figure 12B:
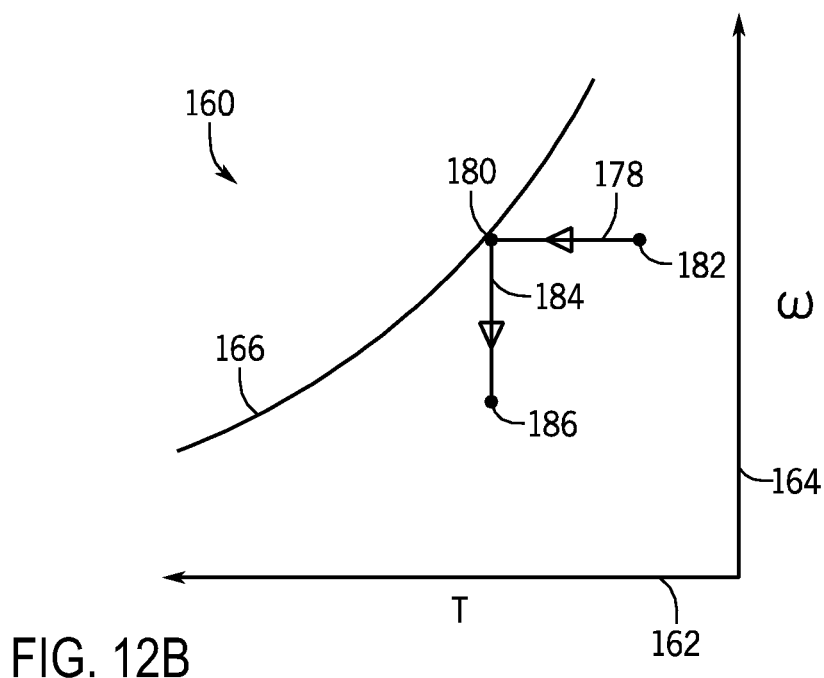
FIG. 12B is a psychrometric chart of the temperature and the humidity ratio of the air flowing through an indirect evaporative cooling unit and the dehumidification unit of FIG. 11 in accordance with an embodiment of the present disclosure.

FIGS. 12A and 12B are psychrometric charts 158, 160 of the temperature and the humidity ratio of the air 14 flowing through the evaporative cooling unit 152 and the dehumidification unit 12 of FIG. 11 in accordance with an embodiment of the present disclosure. More specifically, FIG. 12A is the psychrometric chart 158 of the temperature and the humidity ratio of the air 14 flowing through a direct evaporative cooling unit 152 and the dehumidification unit 12 of FIG. 11 in accordance with an embodiment of the present disclosure, and FIG. 12B is the psychrometric chart 160 of the temperature and the humidity ratio of the air 14 flowing through an indirect evaporative cooling unit 152 and the dehumidification unit 12 of FIG. 11 in accordance with an embodiment of the present disclosure. In particular, in each chart 158, 160, the x-axis 162 corresponds to the temperature of the air 14 flowing through the evaporative cooling unit 152 and the dehumidification unit 12 of FIG. 11, the y-axis 164 corresponds to the humidity ratio of the air 14 flowing through the evaporative cooling unit 152 and the dehumidification unit 12 of FIG. 11, and the curve 166 represents the water vapor saturation curve for a given relative humidity of the air 14 flowing through the evaporative cooling unit 152 and the dehumidification unit 12 of FIG. 11.

As illustrated by line 168 in FIG. 12A, because the relatively cool and moist media 156 is directly introduced into the air 14 flowing though the direct evaporative cooling unit 152, the humidity ratio of the air 14B (i.e., point 170) out of the direct evaporative cooling unit 152 is substantially higher than the humidity ratio of the inlet air 14A (i.e., point 172) into the direct evaporative cooling unit 152. However, the temperature of the air 14B (i.e., point 170) out of the direct evaporative cooling unit 152 is substantially lower than the temperature of the inlet air 14A (i.e., point 172) into the evaporative cooling unit 152. As illustrated by line 174 of FIG. 12A, because water vapor 26 is removed from the air 14B flowing through the dehumidification unit 12, the humidity ratio of the outlet air 14C (i.e., point 176) from the dehumidification unit 12 is lower than the humidity ratio of the air 14B (i.e., point 170) into the dehumidification unit 12, while the temperature of the outlet air 14C and the air 14B are substantially the same. Indeed, the direct evaporative cooling unit 152 humidifies and cools the air 14, while the dehumidification unit 12 subsequently dehumidifies the air 14 at substantially constant temperature.

As illustrated by line 178 in FIG. 12B, because the relatively cool and moist media 156 indirectly cools the air 14 flowing through the indirect evaporative cooling unit 152, the humidity ratio of the air 14B (i.e., point 180) out of the indirect evaporative cooling unit 152 is substantially the same as the humidity ratio of the inlet air 14A (i.e., point 182) into the indirect evaporative cooling unit 152. However, the temperature of the air 14B (i.e., point 180) out of the indirect evaporative cooling unit 152 is substantially lower than the temperature of the inlet air 14A (i.e., point 182) into the indirect evaporative cooling unit 152. As illustrated by line 184 of FIG. 12B, because water vapor 26 is removed from the air 14B flowing through the dehumidification unit 12, the humidity ratio of the outlet air 14C (i.e., point 186) from the dehumidification unit 12 is lower than the humidity ratio of the air 14B (i.e., point 180) into the dehumidification unit 12, while the temperature of the outlet air 14C and the air 14B are substantially the same. Indeed, the indirect evaporative cooling unit 152 cools (without substantially humidifying) the air 14, while the dehumidification unit 12 subsequently dehumidifies the air 14 at substantially constant temperature.

As described previously, the control system 64 of FIG. 11 may be configured to control the operation of the evaporative cooling unit 152 and the dehumidification unit 12. For example, the control system 64 may be configured to adjust where points 170, 172, 176 and points 180, 182, 186 of the air 14 fall in the psychrometric charts 158, 160 of FIGS. 12A and 12B when direct and indirect evaporative cooling techniques, respectively, are used in the evaporative cooling unit 152 of FIG. 11.

Figure 13:
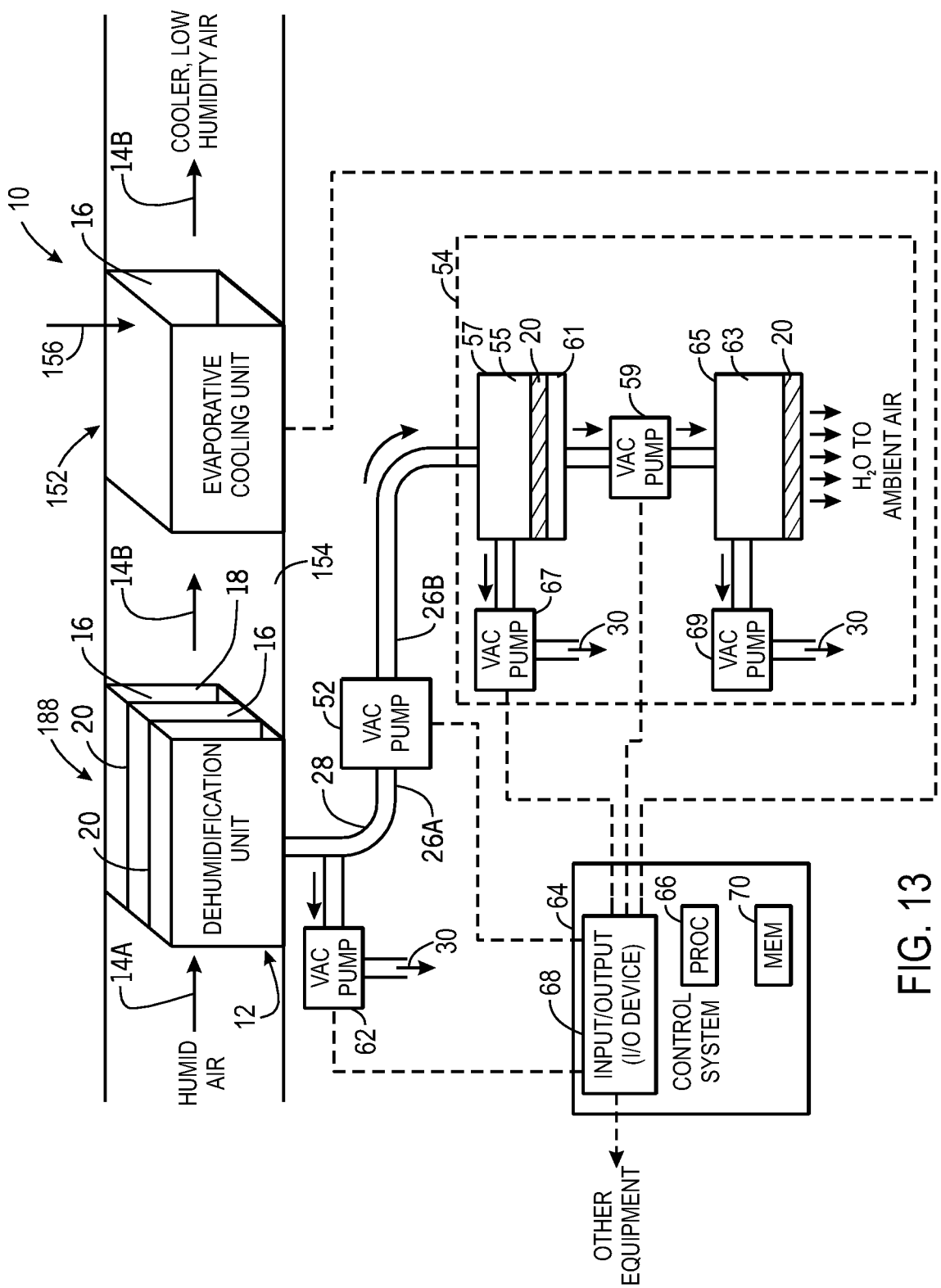
FIG. 13 is a schematic diagram of an HVAC system having the evaporative cooling unit disposed downstream of the dehumidification unit in accordance with an embodiment of the present disclosure.

FIG. 13 is a schematic diagram of an HVAC system 188 having the evaporative cooling unit 152 disposed downstream of the dehumidification unit 12 in accordance with an embodiment of the present disclosure. The HVAC system 188 of FIG. 13 generally functions the same as the HVAC system 8 of FIGS. 1, 6, and 7 and the HVAC system 150 of FIG. 11. However, as illustrated in FIG. 13, the HVAC system 188 first receives the relatively humid inlet air 14A into the dehumidification unit 12. As described previously, the relatively humid inlet air 14A is first dehumidified in the dehumidification unit 12 and expelled as relatively dry air 14B into the duct 154. The evaporative cooling unit 152 then reduces the temperature of the dry air 14B and expels cooler dry air 14C into the conditioned space.

As described previously with respect to FIG. 11, the evaporative cooling unit 152 of FIG. 13 may either be a direct evaporative cooling unit or an indirect evaporative cooling unit. In other words, when the evaporative cooling unit 152 uses direct evaporative cooling techniques, the relatively cool and moist media 156 (e.g., relatively cool water) is directly added to the relatively dry air 14B in the duct 154. However, when the evaporative cooling unit 152 uses indirect evaporative cooling techniques, the relatively dry air 14B may, for example, flow across one side of a plate of a heat exchanger while the relatively cool and moist media 156 flows across another side of the plate of the heat exchanger. In other words, generally speaking, some of the relatively cool moisture from the relatively cool and moist media 156 is indirectly added to the relatively dry air 14B in the duct 154. Whether direct or indirect evaporative cooling techniques are used in the evaporative cooling unit 152 affects the rate of humidity removal and temperature reduction of the air 14 that flows through the HVAC system 188 of FIG. 13. In general, however, the dehumidification unit 12 initially lowers the humidity ratio at approximately constant temperature, and the evaporative cooling unit 152 cools the air 14 to a temperature as low as possible for the particular application.

As illustrated, many of the components of the HVAC system 188 of FIG. 13 may be considered identical to the components of the HVAC system 8 of FIGS. 1, 6, and 7 and the HVAC system 150 of FIG. 11. For example, as described previously, HVAC system 188 of FIG. 13 includes the membrane water vapor rejection unit 54 that receives water vapor 26B having a partial pressure just high enough to facilitate water vapor rejection, as described previously. The "other equipment," as depicted may include one or more fans controlled by the controller 64. The fans may be useful in driving air through the membranes 20.

In addition, the control system 64 of FIGS. 7 and 11 may also be used in the HVAC system 188 of FIG. 13 to control the operation of the HVAC system 188 in a similar manner as described previously with respect to FIGS. 7 and 11. For example, as described previously, the control system 64 may be configured to control the rate of removal of the other air components 30 of the water vapor 26A in the water vapor vacuum volume 28 by turning the vacuum pump 52 (or separate vacuum pump 62) on or off, or by modulating the rate at which the vacuum pump 52 (or separate vacuum pump 62) removes the other air components 30. More specifically, in certain embodiments, the control system 64 may receive signals from sensors in the water vapor vacuum volume 28 that detect when too many other air components 30 are present in the water vapor 26A contained in the water vapor vacuum volume 28.

In addition, the control system 64 may modulate the lower partial pressure of the water vapor 26A in the water vapor vacuum volume 28 to modify the water vapor removal capacity and efficiency ratio of the dehumidification unit 12. For example, the control system 64 may receive signals from pressure sensors in the water vapor vacuum volume 28, the water vapor channels 18, as well as signals generated by sensors relating to characteristics (e.g., temperature, pressure, flow rate, relative humidity, and so forth) of the air 14 in the dehumidification unit 12, the evaporative cooling unit 152, or both, among other things.

The control system 64 may use this information to determine how to modulate the lower partial pressure of the water vapor 26A in the water vapor vacuum volume 28 to increase or decrease the rate of removal of water vapor 26 from the air channels 16 to the water vapor channels 18 through the interfaces 20 of the dehumidification unit 12 as $H_2O$ (i.e., as water molecules, gaseous water vapor, liquid water, adsorbed/desorbed water molecules, absorbed/desorbed water molecules, and so forth, through the interfaces 20). For example, if more water vapor removal is desired, the lower partial pressure of the water vapor 26A in the water vapor vacuum volume 28 may be reduced and, conversely, if less water vapor removal is desired, the lower partial pressure of the water vapor 26A in the water vapor vacuum volume 28 may be increased. Furthermore, as described above, the amount of dehumidification (i.e., water vapor removal) may be cycled to improve the efficiency of the dehumidification unit 12. More specifically, under certain operating conditions, the dehumidification unit 12 may function more efficiently at higher rates of water vapor removal. As such, in certain embodiments, the dehumidification unit 12 may be cycled to remove a maximum amount of water vapor from the air 14 for a while (e.g., approximately 1 sec, 10 sec, 100 sec, 10 min), then to remove relatively no water vapor from the air 14 for a while (e.g., approximately 1 sec, 10 sec, 100 sec, 10 min), then to remove a maximum amount of water vapor from the air 14 for a while (e.g., approximately 1 sec, 10 sec, 100 sec, 10 min), and so forth. In other words, the dehumidification unit 12 may be operated at full water vapor removal capacity for periods of time alternating with other periods of time where no water vapor is removed.

Furthermore, the control system 64 may also be configured to control operation of the evaporative cooling unit 152. For example, the control system 64 may selectively modulate how much (direct or indirect) evaporative cooling occurs in the evaporating cooling unit 152. As an example, valves may be actuated to control the flow rate of the relatively cool and moist media 156 through the evaporative cooling unit 152, thereby directly affecting the amount of (direct or indirect) evaporative cooling in the evaporative cooling unit 152. In addition, operation of the dehumidification unit 12 and the evaporative cooling unit 152 may be controlled simultaneously. Furthermore, the control system 64 may be configured to control start-up and shutdown sequencing of the dehumidification unit 12 and the evaporative cooling unit 152.

Figure 14A:
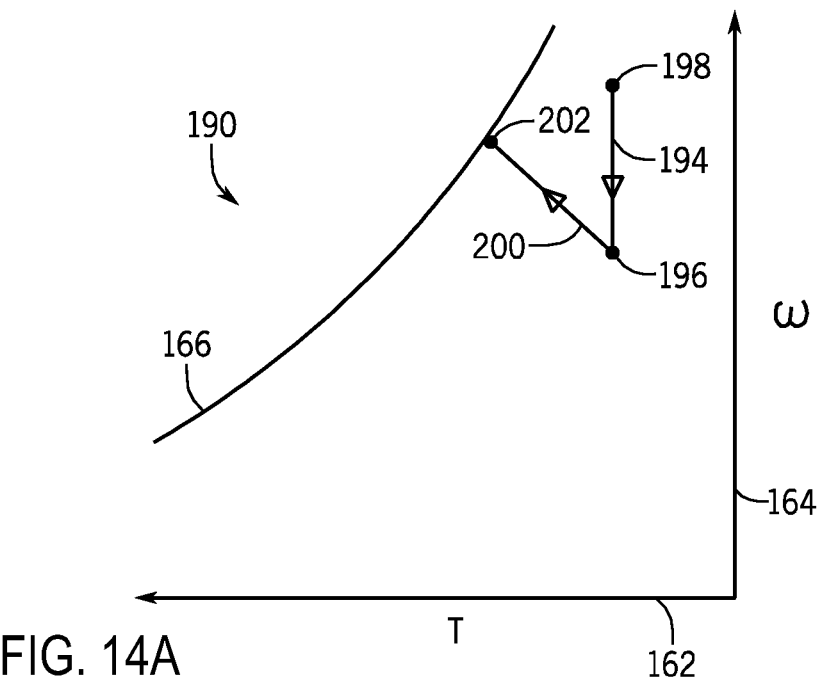
FIG. 14A is a psychrometric chart of the temperature and the humidity ratio of the air flowing through the dehumidification unit and a direct evaporative cooling unit of FIG. 13 in accordance with an embodiment of the present disclosure.
Figure 14B:
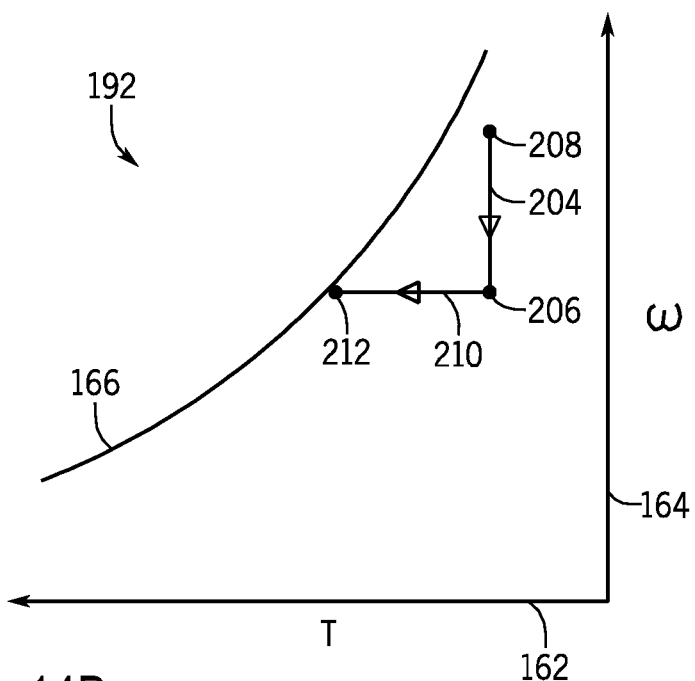
FIG. 14B is a psychrometric chart of the temperature and the humidity ratio of the air flowing through the dehumidification unit and an indirect evaporative cooling unit of FIG. 13 in accordance with an embodiment of the present disclosure.

FIGS. 14A and 14B are psychrometric charts 190, 192 of the temperature and the humidity ratio of the air 14 flowing through the dehumidification unit 12 and the evaporative cooling unit 152 of FIG. 13 in accordance with an embodiment of the present disclosure. More specifically, FIG. 14A is the psychrometric chart 190 of the temperature and the humidity ratio of the air 14 flowing through the dehumidification unit 12 and a direct evaporative cooling unit 152 of FIG. 13 in accordance with an embodiment of the present disclosure, and FIG. 14B is the psychrometric chart 192 of the temperature and the humidity ratio of the air 14 flowing through the dehumidification unit 12 and an indirect evaporative cooling unit 152 of FIG. 13 in accordance with an embodiment of the present disclosure. In particular, as described previously with respect to FIGS. 12A and 12B, the x-axis 162 corresponds to the temperature of the air 14 flowing through the dehumidification unit 12 and the evaporative cooling unit 152 of FIG. 13, the y-axis 164 corresponds to the humidity ratio of the air 14 flowing through the dehumidification unit 12 and the evaporative cooling unit 152 of FIG. 13, and the curve 166 represents the water vapor saturation curve for a given relative humidity of the air 14 flowing through the dehumidification unit 12 and the evaporative cooling unit 152 of FIG. 13.

As illustrated by line 194 in FIG. 14A, because water vapor 26 is removed from the relatively humid inlet air 14A flowing through the dehumidification unit 12, the humidity ratio of the relatively dry air 14B (i.e., point 196) from the dehumidification unit 12 is lower than the humidity ratio of the relatively humid inlet air 14A (i.e., point 198) into the dehumidification unit 12, while the temperature of the relatively dry air 14B and the relatively humid inlet air 14A are substantially the same. As illustrated by line 200 of FIG. 14A, because the relatively cool and moist media 156 is directly introduced into the relatively dry air 14B flowing through the direct evaporative cooling unit 152, the humidity ratio of the outlet air 14C (i.e., point 202) from the direct evaporative cooling unit 152 is substantially higher than the humidity ratio of the relatively dry air 14B (i.e., point 196) into the direct evaporative cooling unit 152. However, the temperature of the outlet air 14C (i.e., point 202) from the direct evaporative cooling unit 152 is substantially lower than the temperature of the relatively dry air 14B (i.e., point 196) into the direct evaporative cooling unit 152. Indeed, the dehumidification unit 12 dehumidifies the air 14 at substantially constant temperature, while the direct evaporative cooling unit 152 subsequently humidifies and cools the air 14.

As illustrated by line 204 in FIG. 14B, because water vapor 26 is removed from the relatively humid inlet air 14A flowing through the dehumidification unit 12, the humidity ratio of the relatively dry air 14B (i.e., point 206) from the dehumidification unit 12 is lower than the humidity ratio of the relatively humid inlet air 14A (i.e., point 208) into the dehumidification unit 12, while the temperature of the relatively dry air 14B and the relatively humid inlet air 14A are substantially the same. As illustrated by line 210 of FIG. 14B, because the relatively cool and moist media 156 indirectly cools the relatively dry air 14B flowing though the indirect evaporative cooling unit 152, the humidity ratio of the outlet air 14C (i.e., point 212) from the indirect evaporative cooling unit 152 is substantially the same as the humidity ratio of the relatively dry air 14B (i.e., point 206) into the indirect evaporative cooling unit 152. However, the temperature of the outlet air 14C (i.e., point 212) from the indirect evaporative cooling unit 152 is substantially lower than the temperature of the relatively dry air 14B (i.e., point 206) into the indirect evaporative cooling unit 152. Indeed, the dehumidification unit 12 dehumidifies the air 14 at substantially constant temperature, while the indirect evaporative cooling unit 152 cools (without substantially humidifying) the air 14.

As described previously, the control system 64 of FIG. 13 may be configured to control the operation of the dehumidification unit 12 and the evaporative cooling unit 152. For example, the control system 64 may be configured to adjust where points 196, 198, 202 and points 206, 208, 212 of the air 14 fall in the psychrometric charts 190, 192 of FIGS. 14A and 14B when direct and indirect evaporative cooling techniques, respectively, are used in the evaporative cooling unit 152 of FIG. 13.

The embodiments of the HVAC systems 150, 188 of FIGS. 11 and 13 are not the only ways in which dehumidification units 12 may be combined with evaporative cooling units 152. More specifically, whereas FIGS. 11 and 13 illustrate the use of a single dehumidification unit 12 and a single evaporative cooling unit 152 in series with each other, in other embodiments, any number of dehumidification units 12 and evaporative cooling units 152 may be used in series with each other. As another example, in one embodiment, a first dehumidification unit 12 may be followed by a first evaporative cooling unit 152, which is in turn followed by a second dehumidification unit 12, which is in turn followed by a second evaporative cooling unit 152, and so forth. However, any number of dehumidification units 12 and evaporative cooling units 152 may indeed be used in series with each other, wherein the air 14 exiting each unit 12, 152 is directed into the next downstream unit 12, 152 in the series (except from the last unit 12, 152 in the series, from which the air 14 is expelled into the conditioned space). In other words, the air 14 exiting each dehumidification unit 12 in the series is directed into a downstream evaporative cooling unit 152 (or to the conditioned space, if it is the last unit in the series), and the air 14 exiting each evaporative cooling unit 152 in the series is directed into a downstream dehumidification unit 12 (or to the conditioned space, if it is the last unit in the series). As such, the temperature of the air 14 may be successively lowered in each evaporative cooling unit 152 between dehumidification units 12 in the series, and the humidity ratio of the air 14 may be successively lowered in each dehumidification unit 12 between evaporative cooling units 152 in the series. This process may be continued within any number of dehumidification units 12 (e.g., 2, 3, 4, 5, 6, 7, 8, 9, 10, or more) and evaporative cooling units 152 until the desired final temperature and humidity ratio conditions of the air 14 are achieved. In one embodiment, each dehumidification unit 12 may be combined with a corresponding evaporative cooling unit 152. In another embodiment, more than one dehumidification unit 12 may be combined with a single evaporative cooling unit 152, or vice versa.

Figure 15A:
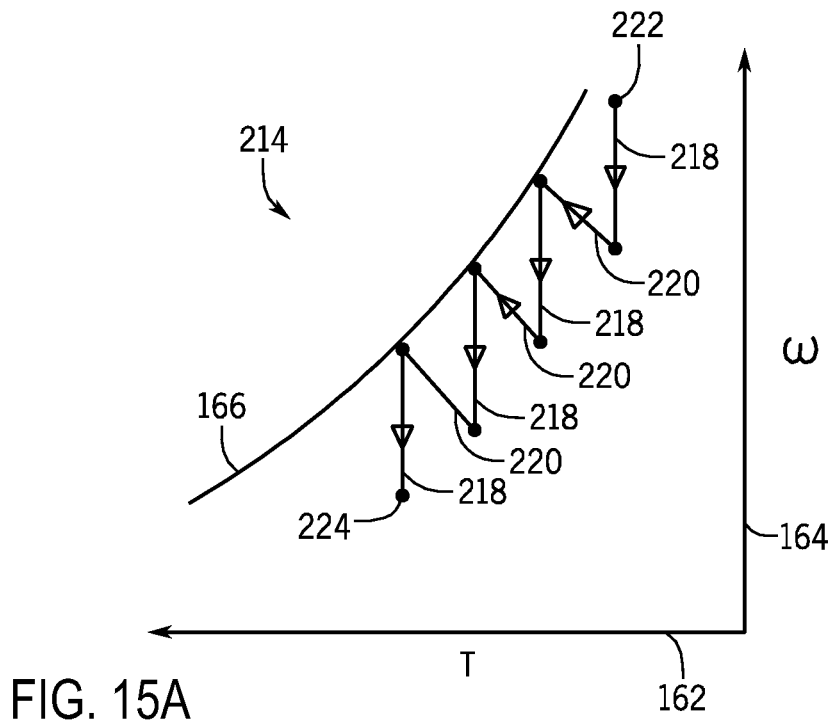
FIG. 15A is a psychrometric chart of the temperature and the humidity ratio of the air flowing through a plurality of dehumidification units and a plurality of direct evaporative cooling units in accordance with an embodiment of the present disclosure.
Figure 15B:
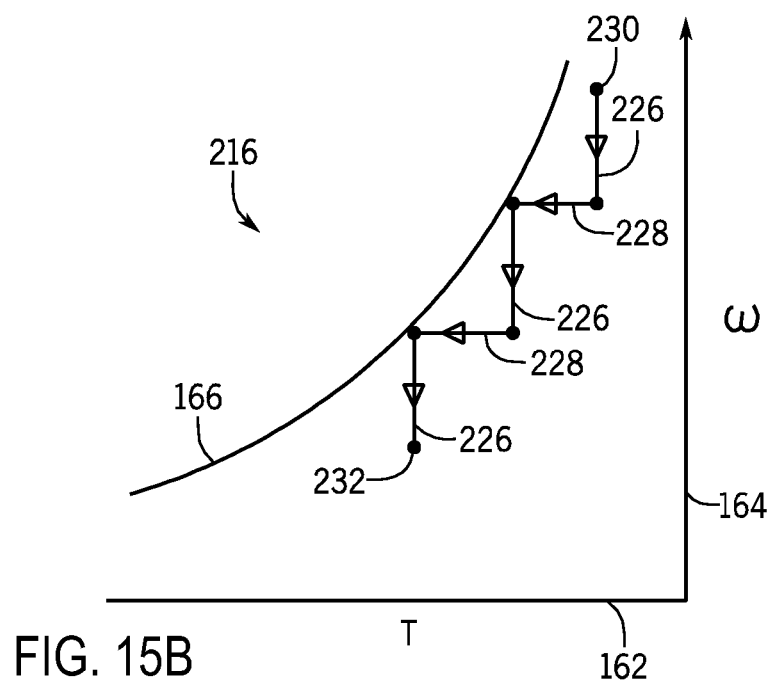
FIG. 15B is a psychrometric chart of the temperature and the humidity ratio of the air flowing through a plurality of dehumidification units and a plurality of indirect evaporative cooling units in accordance with an embodiment of the present disclosure.

FIGS. 15A and 15B are psychrometric charts 214, 216 of the temperature and the humidity ratio of the air 14 flowing through a plurality of dehumidification units 12 and a plurality of evaporative cooling units 152 in accordance with an embodiment of the present disclosure. More specifically, FIG. 15A is a psychrometric chart 214 of the temperature and the humidity ratio of the air 14 flowing through a plurality of dehumidification units 12 and a plurality of direct evaporative cooling units 152 in accordance with an embodiment of the present disclosure, and FIG. 15B is a psychrometric chart 216 of the temperature and the humidity ratio of the air 14 flowing through a plurality of dehumidification units 12 and a plurality of indirect evaporative cooling units 152 in accordance with an embodiment of the present disclosure. In particular, in each chart 214, 216, the x-axis 162 corresponds to the temperature of the air 14 flowing through the plurality of dehumidification units 12 and the plurality of evaporative cooling units 152, the y-axis 164 corresponds to the humidity ratio of the air 14 flowing through the plurality of dehumidification units 12 and the plurality of evaporative cooling units 152, and the curve 166 represents the water vapor saturation curve for a given relative humidity of the air 14 flowing through the plurality of dehumidification units 12 and the plurality of evaporative cooling units 152.

As illustrated by lines 218 in FIG. 15A, because water vapor 26 is removed from relatively humid air 14 flowing through each of the plurality of dehumidification units 12, the humidity ratio of the air 14 substantially decreases while the temperature of the air 14 remains substantially the same in each of the plurality of dehumidification units 12. As illustrated by lines 220 in FIG. 15A, because the relatively cool and moist media 156 is directly introduced into the relatively dry air 14 flowing though each of the direct evaporative cooling units 152, the humidity ratio of the air 14 increases while the temperature of the air 14 substantially decreases in each of the plurality of direct evaporative cooling units 152. In other words, each of the plurality of dehumidification units 12 successively dehumidifies the air 14 at substantially constant temperature, while each of the plurality of direct evaporative cooling units 152 successively humidifies and cools the air 14 until the desired final conditions of temperature and humidity ratio are achieved. More specifically, as illustrated in FIG. 15A, the lines 218, 220 generally form a "step function" progression from the initial conditions of temperature and humidity ratio of the inlet air 14 (i.e., point 222) to the final conditions of temperature and humidity ratio of the outlet air 14 (i.e., point 224).

As illustrated by lines 226 in FIG. 15B, because water vapor 26 is removed from relatively humid air 14 flowing through each of the plurality of dehumidification units 12, the humidity ratio of the air 14 substantially decreases while the temperature of the air 14 remains substantially the same in each of the plurality of dehumidification units 12. As illustrated by lines 228 in FIG. 15B, because the relatively cool and moist media 156 indirectly interacts with the relatively dry air 14 flowing though each of the indirect evaporative cooling units 152, the humidity ratio of the air 14 remains substantially the same while the temperature of the air 14 substantially decreases in each of the plurality of indirect evaporative cooling units 152. In other words, each of the plurality of dehumidification units 12 successively dehumidifies the air 14 at substantially constant temperature, while each of the plurality of indirect evaporative cooling units 152 successively cools the air 14 at substantially constant humidity ratio until the desired final conditions of temperature and humidity ratio are achieved. More specifically, as illustrated in FIG. 15B, the lines 226, 228 generally form a "sawtooth" progression from the initial conditions of temperature and humidity ratio of the inlet air 14 (i.e., point 230) to the final conditions of temperature and humidity ratio of the outlet air 14 (i.e., point 232).

Because evaporative cooling units 152 are used between dehumidification units 12, each dehumidification unit 12 will receive air 14 that is cooler and at a lower partial pressure of water vapor than the upstream dehumidification units 12. As such, each of the dehumidification units 12 will operate at substantially different operating conditions. Accordingly, the control system 64 may be used to modulate the operating parameters (e.g., the partial pressures of water vapor in the water vapor vacuum volumes 28, among other things) of the dehumidification units 12 to take into account the variations between dehumidification units 12. Similarly, because dehumidification units 12 are used between evaporative cooling units 152, each evaporative cooling unit 152 will also receive air 14 that is cooler and at a lower partial pressure of water vapor than the upstream evaporative cooling units 152. As such, each of the evaporative cooling units 152 will also operate at substantially different operating conditions. Accordingly, the control system 64 may also be used to modulate the operating parameters (e.g., the flow rates of the relatively cool and moist media 156, among other things) of the evaporative cooling units 152 to take into account the variations between evaporative cooling units 152. In addition, the control system 64 may also simultaneously coordinate operation of the plurality of dehumidification units 12 and the plurality of evaporative cooling units 152 to take the variations into account.

The evaporative cooling units 152 of FIGS. 11 and 13 not only serve to lower the temperature of the air 14, but also serve to clean the air 14 by, for example, passing the air 14 through a moist, fibrous mat. In addition, the dehumidification units 12 and the evaporative cooling units 14 may be operated at variable speeds or fixed speeds for optimal operation between different initial temperature and humidity conditions (i.e., operating points 222 and 230 in FIGS. 15A and 15B, respectively) and the final temperature and humidity conditions (i.e., operating points 224 and 232 in FIGS. 15A and 15B, respectively). Furthermore, the evaporative cooling units 152 are relatively low-energy units, thereby minimizing overall operating costs.

Figure 16:
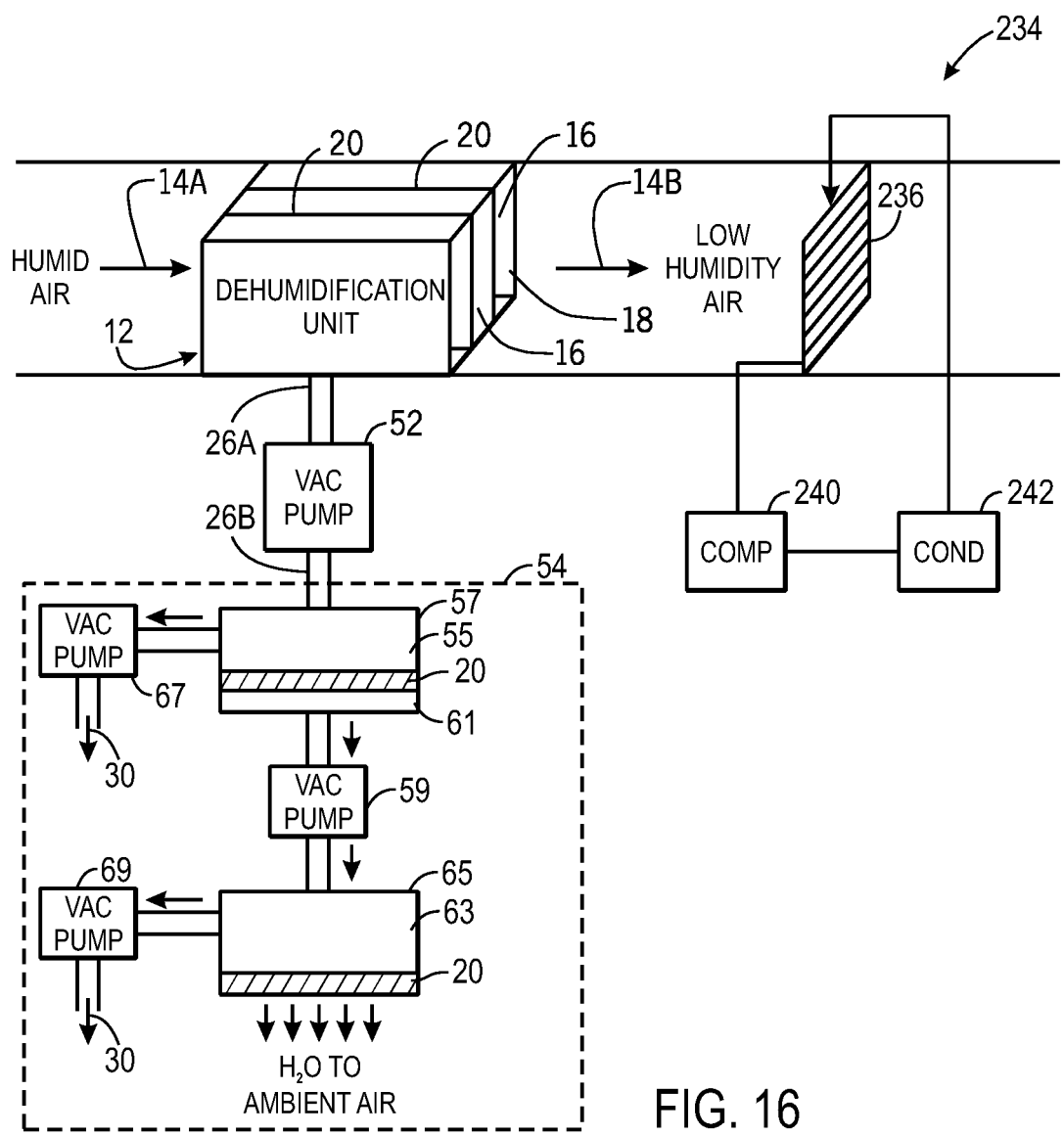
FIG. 16 is a schematic diagram of an HVAC system having a mechanical cooling unit disposed downstream of the dehumidification unit in accordance with an embodiment of the present disclosure.
Figure 17:
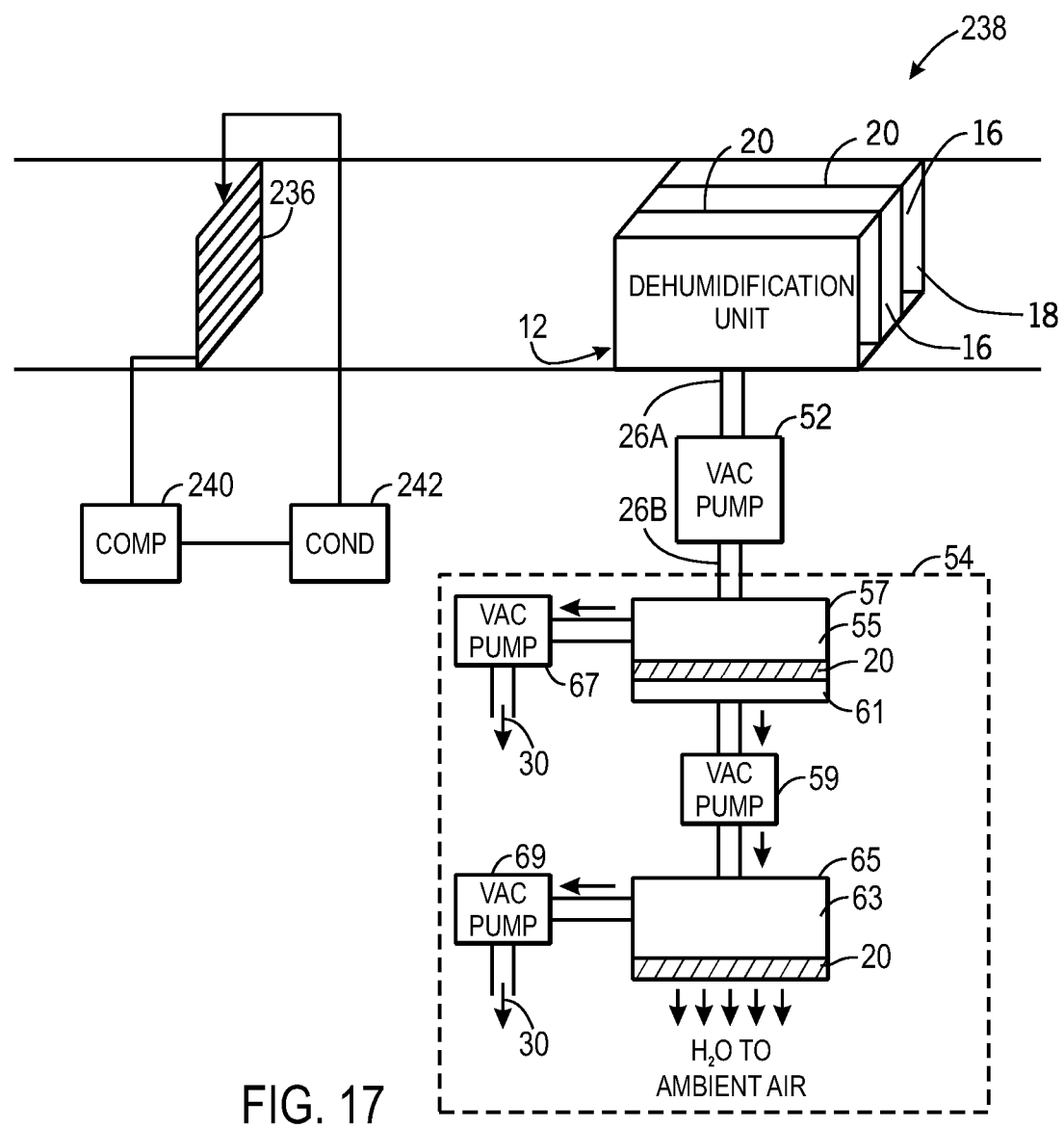
FIG. 17 is a schematic diagram of an HVAC system having the mechanical cooling unit of FIG. 16 disposed downstream of the dehumidification unit in accordance with an embodiment of the present disclosure.

In addition to the embodiments described previously, in other embodiments, one or more of the dehumidification unit 12 described herein may be used in conjunction with one or more mechanical cooling units. For example, FIG. 16 is a schematic diagram of an HVAC system 234 having a mechanical cooling unit 236 disposed upstream of the dehumidification unit 12 in accordance with an embodiment of the present disclosure, and FIG. 17 is a schematic diagram of an HVAC system 238 having the mechanical cooling unit 236 of FIG. 16 disposed downstream of the dehumidification unit 12 in accordance with an embodiment of the present disclosure. In each of these embodiments, the mechanical cooling unit 236 may include components typical for mechanical cooling units 236 such as a compressor 240 (e.g., a variable speed compressor), a condenser 242, and so forth. A refrigerant is recycled through the components to cool the air received from the dehumidification unit 12 (i.e., FIG. 16) or the air delivered to the dehumidification unit (i.e., FIG. 17) to deliver non-latent, sensible compression cooling to the air. Although the embodiments illustrated in FIGS. 16 and 17 illustrate the use of one dehumidification unit 12 and one mechanical cooling unit 236 in series, in other embodiments, any number of the dehumidification units 12 and mechanical cooling units 236 may be used in series, parallel, or some combination thereof (similar to the embodiments described previously). In certain embodiments, one or more dehumidification units 12 may be retrofitted into existing HVAC systems have mechanical cooling units 236. Additionally, both FIG. 16 and FIG. 17 depict the use of the membrane water vapor rejection system 54, as described above. Because similar elements are shown in FIGS. 16 and 17, the elements are depicted with like numerals. In one embodiment, a cooling system, such as the mechanical cooling unit 236, the evaporative cooling unit 152, or a combination thereof, may be placed between dehumidification units 12. That is, the cooling system (e.g., mechanical cooling unit 236 and/or evaporative cooling unit 152) may be place downstream of a first dehumidification unit 12 and upstream of a second dehumidification unit 12. This embodiment of having the cooling system between dehumidification units 12 can result in an increase in overall sensible cooling efficiency compared with single stage sensible cooling while retaining the added efficiencies of multistage dehumidification. For example, this embodiment may exhibit the efficiencies described with respect to FIG. 15b.

Figure 18:
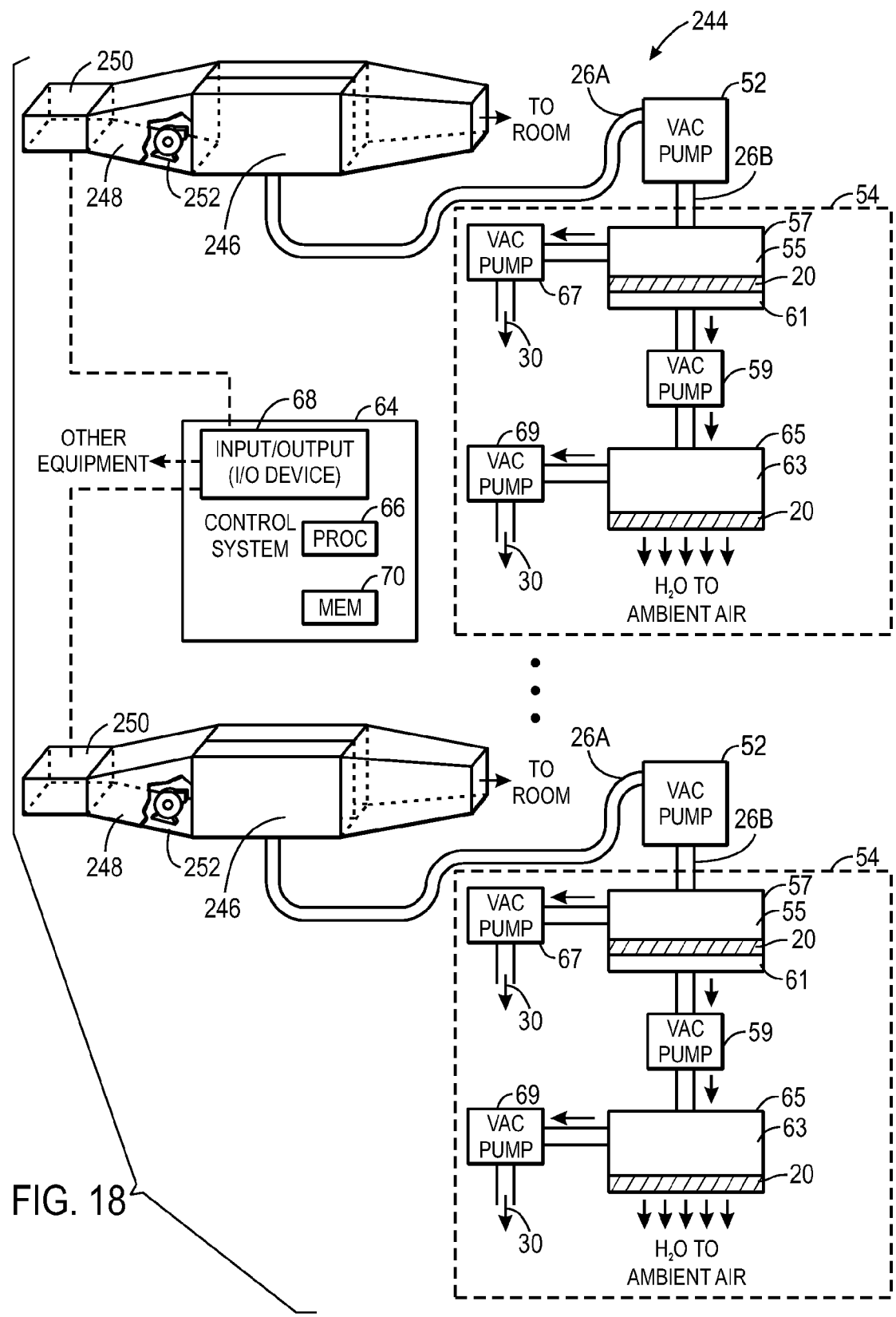
FIG. 18 is a schematic diagram of an HVAC system using mini-dehumidification units in accordance with an embodiment of the present disclosure.

In addition, in certain embodiments, the dehumidification units 12 described herein may be used as distributed dehumidification units 12 that may, for example, be portable and may be retrofitted into existing HVAC systems. For example, FIG. 18 is a schematic diagram of an HVAC system 244 using mini-dehumidification units 246 in accordance with an embodiment of the present disclosure, wherein the mini-dehumidification units 246 include all of the functionality of the dehumidification units 12 described previously. As illustrated, the mini-dehumidification units 246 may be connected to existing ducts 248 of the components 250 of the HVAC system 244 to improve the dehumidification capabilities of the HVAC system 244. In certain embodiments, fans 252 (e.g., variable speed fans) may be used to blow air from the existing HVAC components 250 of the HVAC system 244 into the mini-dehumidification units 246. The mini-dehumidification units 246 may be sized to facilitate coordination with standard components of existing HVAC systems. Additionally, FIG. 18 depicts the usage of the membrane water vapor rejection system 54, as described above. Because similar elements are shown in FIG. 18, the elements are depicted with like numerals.

The control system 64 may be used to control the HVAC system 244, including the mini-dehumidification units 246. For example, the control system 64 may be configured to control start-up and shutdown sequencing of the mini-dehumidification units 246, and the fans 252. Additionally, the control system 64 may vary fan speed to increase or decrease air movement.

In addition, in certain embodiments, the dehumidification units 12 described herein may be modified slightly to use them as enthalpy recovery ventilators (ERVs). For example, in a first ERV embodiment, relatively high humidity air and relatively low humidity air may flow in a counterflow arrangement on opposite sides of an interface 20 (e.g., a water vapor permeable membrane) as described previously. Alternatively, in a second ERV embodiment, relatively high humidity air and relatively low humidity air may flow in a parallel flow arrangement on opposite sides of an interface 20 as described previously. In both of these embodiments, the vacuum pump 52 described previously may not be required. Rather, both humidity and sensible heat may be recovered through transfer between the relatively high humidity air and the relatively low humidity air through the interface 20. In addition, both of the ERV embodiments may have sections inserted between the interface 20 to increase heat transfer between the relatively high humidity air and the relatively low humidity air on opposite sides of the interface 20.

In addition, the ERV embodiments described previously may be combined with other stages to improve the overall performance of the system. For example, in certain embodiments, a single section membrane dehumidification unit 12 with associated vacuum pump 52 and membrane water vapor rejection system 54 (e.g., such as the HVAC system 10 of FIGS. 1, 6, and 7) may be connected upstream or downstream (or both) of one of the ERV embodiments. In other embodiments, a multistage membrane dehumidification unit 12 with associated vacuum pump 52 and water vapor rejection system 54 (e.g., such as the HVAC systems 72, 98, 120 of FIGS. 8 through 10) may be connected upstream or downstream (or both) of one of the ERV embodiments. In other embodiments, a single stage or multi-stage dehumidification unit 12 with associated vacuum pump 52, water vapor rejection system 54, and one or more evaporative cooling units 152 (e.g., such as the HVAC systems 150, 188 of FIGS. 11 and 13) may be connected upstream or downstream (or both) of one of the ERV embodiments. In other embodiments, a single stage or multi-stage membrane dehumidification unit 12 with sensible compression cooling (e.g., such as the HVAC systems 234, 238 of FIGS. 16 and 17) may be connected upstream or downstream (or both) of one of the ERV embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dehumidification system for removing water vapor from an airstream, comprising:
   a first and second channel separated by a first membrane, wherein the first membrane is configured to facilitate removal of water vapor from an airstream flowing through the first channel by facilitating passage of $H_2O$ from the water vapor to the second channel through permeable volumes of the first membrane while substantially blocking all other components of the airstream from passing through the first membrane;
   a first pressure increasing device configured to create a lower partial pressure of water vapor within the second channel than in the first channel, such that the $H_2O$ moves through the first membrane to the second channel, wherein the pressure increasing device is also configured to increase the pressure of water vapor at an outlet of the pressure increasing device to a partial pressure of water vapor in a range suitable for directing the water vapor into a membrane water vapor rejection system;
   the membrane water vapor rejection system configured to receive the water vapor from the first pressure increasing device and to permit the water vapor to be rejected to an atmosphere while substantially blocking flow of other air components from the atmosphere from entering into the membrane water vapor rejection system; and
   a controller configured to control start-up, shutdown, and operation of the dehumidification system.

2. The system of claim 1, wherein the membrane water vapor rejection system comprises a first membrane container having a second membrane, and wherein the water vapor is rejected through the second membrane.

3. The system of claim 1, wherein the membrane water vapor rejection system comprises a second pressure increasing device and a second membrane container having a third membrane, and wherein the second pressure increasing device is configured to create a partial pressure suitable for moving the water vapor from the second membrane container through the third membrane and into the first membrane container.

4. The system of claim 3, wherein the membrane water rejection system comprises a third and a fourth pressure increasing device, and wherein the third pressure increasing device is configured to purge the first membrane container of the other air components and the fourth pressure increasing device is configured to purge the second membrane container of the other air components.

5. The system of claim 1, comprising a controller configured to increase efficiency of the operation of the dehumidification system by substantially minimizing an energy use.

6. The system of claim 5, wherein the first pressure increasing device comprises a vacuum pump, and wherein the controller is configured to substantially reduce the energy use by substantially reducing a pump energy used to drive the vacuum pump.

7. The system of claim 1, comprising a vacuum pump that removes other air components from water vapor in the second channel.

8. The system of claim 1, comprising a condensation system configured to receive the water vapor from the pressure increasing device in parallel with the membrane water rejection system.

9. The system of claim 1, wherein the other air components comprise nitrogen, oxygen, carbon dioxide, or a combination thereof.

10. The system of claim 1, wherein the first membrane comprises a zeolite.

11. A system, comprising:
a first dehumidification system for removing $H_2O$ vapor from an airstream, comprising:
an air channel configured to receive an inlet airstream and discharge an outlet airstream;
a first $H_2O$ permeable material adjacent to the air channel, wherein the first $H_2O$ permeable material is configured to selectively enable $H_2O$ from $H_2O$ vapor in the inlet airstream to pass through the first $H_2O$ permeable material to a suction side of the first $H_2O$ permeable material and substantially block other components in the inlet airstream from passing through the first $H_2O$ permeable material to the suction side of the first $H_2O$ permeable material;
a first pressure increasing device configured to create a lower partial pressure of $H_2O$ vapor on the suction side of the first $H_2O$ permeable material than the partial pressure of the $H_2O$ vapor in the inlet airstream to drive passage of the $H_2O$ from the $H_2O$ vapor in the inlet airstream through the first $H_2O$ permeable material, and to increase the pressure at an outlet of the pressure increasing device to a partial pressure of $H_2O$ vapor suitable for passing into a membrane water vapor rejection system;
the membrane water vapor rejection system configured to receive the water vapor from the first pressure increasing device and to permit the water vapor to be rejected to an atmosphere while substantially blocking flow of other air components from the atmosphere into the membrane water vapor rejection system; and
a controller configured to control the first dehumidification system, the cooling system, or a combination thereof.

12. The system of claim 11, comprising a cooling system disposed upstream from the first dehumidification system, downstream from the first dehumidification system, or a combination thereof.

13. The system of claim 11, comprising a second dehumidification system and a cooling system, wherein the cooling system is disposed downstream from the first dehumidification system and upstream from the second dehumidification system.

14. The system of claim 12, wherein the cooling system comprises an evaporative cooling unit, a mechanical cooling unit, or a combination thereof.

15. The system of claim 11, wherein the membrane water vapor rejection system comprises a first membrane container having a second membrane, and wherein the water vapor is rejected through the second membrane.

16. A method, comprising:
using a pressure differential across an $H_2O$ permeable material to provide a force to move $H_2O$ through the $H_2O$ permeable material into an $H_2O$ vapor channel, wherein the $H_2O$ vapor channel has a partial pressure of $H_2O$ vapor in a range of approximately between 0.1 to 0.25 psia;
receiving $H_2O$ vapor from the $H_2O$ permeable material into the $H_2O$ vapor channel;
receiving the $H_2O$ vapor from the $H_2O$ vapor channel into a pressure increasing device and expelling the $H_2O$ vapor from the pressure increasing device at a partial pressure of $H_2O$ vapor in a range of approximately between 0.1 to 1.0 psia; and
receiving the $H_2O$ vapor from the pressure increasing device into a membrane $H_2O$ vapor rejection system and expelling the $H_2O$ vapor to an atmosphere.

17. The method of embodiment 16, comprising receiving an airstream including the $H_2O$ into an air inlet channel, and using the pressure differential across the $H_2O$ permeable material to provide the force to move $H_2O$ from the airstream through the $H_2O$ permeable material into the $H_2O$ vapor channel.

18. The method of embodiment 16, comprising substantially blocking passage of other components of the airstream through the $H_2O$ permeable material.

19. The method of embodiment 16, wherein the $H_2O$ permeable material comprises an $H_2O$ permeable membrane.

20. A dehumidification system for removing water vapor from an airstream, comprising:
a first and second channel separated by a first membrane, wherein the first membrane is configured to facilitate removal of water vapor from an airstream flowing through the first channel by facilitating passage of $H_2O$ from the water vapor to the second channel through permeable volumes of the first membrane while substantially blocking all other components of the airstream from passing through the first membrane;
a first pressure increasing device configured to create a lower partial pressure of water vapor within the second channel than in the first channel, such that the $H_2O$ moves through the first membrane to the second channel, wherein the pressure increasing device is also configured to increase the pressure of water vapor at an outlet of the pressure increasing device to a partial pressure of water vapor in a range suitable for directing the water vapor into a membrane water vapor rejection system;
the membrane water vapor rejection system configured to receive the water vapor from the first pressure increasing device and to permit the water vapor to be rejected to an atmosphere while substantially blocking flow of other air components from the atmosphere from entering into the membrane water vapor rejection system; and a vacuum pump that removes other air components from water vapor in the second channel.

21. A dehumidification system for removing water vapor from an airstream, comprising:

a first and second channel separated by a first membrane comprising a zeolite, wherein the first membrane is configured to facilitate removal of water vapor from an airstream flowing through the first channel by facilitating passage of $H_2O$ from the water vapor to the second channel through permeable volumes of the first membrane while substantially blocking all other components of the airstream from passing through the first membrane;

a first pressure increasing device configured to create a lower partial pressure of water vapor within the second channel than in the first channel, such that the $H_2O$ moves through the first membrane to the second channel, wherein the pressure increasing device is also configured to increase the pressure of water vapor at an outlet of the pressure increasing device to a partial pressure of water vapor in a range suitable for directing the water vapor into a membrane water vapor rejection system; and the membrane water vapor rejection system configured to receive the water vapor from the first pressure increasing device and to permit the water vapor to be rejected to an atmosphere while substantially blocking flow of other air components from the atmosphere from entering into the membrane water vapor rejection system.

* * * * *